(12) United States Patent
Iwasaki

(10) Patent No.: US 7,474,597 B2
(45) Date of Patent: Jan. 6, 2009

(54) WRITING METHOD FOR OPTICAL DISC, PROCESSING METHOD FOR INFORMATION, OPTICAL DISC APPARATUS, AND INFORMATION PROCESSING APPARATUS

(75) Inventor: Hideki Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 424 days.

(21) Appl. No.: 11/269,576

(22) Filed: Nov. 9, 2005

(65) Prior Publication Data

US 2006/0067190 A1 Mar. 30, 2006

Related U.S. Application Data

(62) Division of application No. 10/096,820, filed on Mar. 14, 2002, now Pat. No. 7,012,867.

(30) Foreign Application Priority Data

| Mar. 19, 2001 | (JP) | ............................. 2001-078159 |
| Apr. 26, 2001 | (JP) | ............................. 2001-129986 |
| Aug. 30, 2001 | (JP) | ............................. 2001-261036 |

(51) Int. Cl.
*G11B 5/09* (2006.01)

(52) U.S. Cl. .............. 369/47.48; 369/59.13; 369/59.19; 369/59.23

(58) Field of Classification Search .............. 369/47.48, 369/59.13, 59.23, 59.19, 47.1, 47.15, 47.31, 369/47.36, 47.28, 59.1, 59.14, 275.1, 275.4, 369/47.46, 30.12, 44.28

See application file for complete search history.

(56) References Cited

U.S. PATENT DOCUMENTS

| 5,444,687 | A | 8/1995 | Okumura |
| 6,052,347 | A | 4/2000 | Miyata |
| 6,628,575 | B1 | 9/2003 | Ikeda et al. |
| 7,012,867 | B2 * | 3/2006 | Kurobe et al. ............ 369/47.48 |
| 2002/0044507 | A1 | 4/2002 | Hagiwara et al. |

FOREIGN PATENT DOCUMENTS

| JP | 06-12785 | 1/1994 |
| JP | 06-044595 | 2/1994 |
| JP | 07-192390 | 7/1995 |
| JP | 2000-306246 | 11/2000 |
| JP | 2001-067777 | 3/2001 |
| JP | 2001-176193 | 6/2001 |
| JP | 2002-251817 | 9/2002 |

* cited by examiner

*Primary Examiner*—Ali Neyzari
(74) *Attorney, Agent, or Firm*—Dickstein Shapiro LLP

(57) ABSTRACT

A writing method for an optical disc to optimize a writing speed, wherein a spiral track on the optical disc is divided into a plurality of zones, and different CLV writing speeds are used for performing a ZCLV writing to the zones respectively. The writing method comprises steps of: setting a plurality of writing modes; storing a plurality of zone parameter sets for the writing modes respectively in a memory, wherein each of the zone parameter sets comprises dividing times for dividing the zones, and the different CLV writing speeds for the zone respectively; determining a disc type of the optical disc by a disc type determining device before the ZCLV writing is performed; selecting one of the zone parameter sets that is suitable to the disc type of the optical disc; and performing the ZCLV writing with the writing mode corresponding to the selected zone parameter set.

6 Claims, 31 Drawing Sheets

| mode | writing speed | | | dividing position | |
|---|---|---|---|---|---|
| | s1 | s2 | s3 | t1 | t2 |
| 1 | 8 | 8 | 8 | | |
| 2 | 8 | 12 | 12 | 5 | |
| 3 | 8 | 20 | 24 | 5 | 30 |
| 4 | 12 | 12 | 12 | | |
| 5 | 20 | 20 | 24 | | 15 |

FIG. 3

| disc type | writing mode |
|---|---|
| cyanine type, A company | 5 |
| phthalo type, A company | 4 |
| cyanine type, C company | 1 |
| phthalo type, D company | 1 |
| phthalo type, E company | 3 |
| phthalo type, F company | 2 |

FIG. 4

| disc type | maximum writing speed |
|---|---|
| cyanine type, A company | 24 |
| phthalo type, A company | 12 |
| cyanine type, C company | 8 |
| phthalo type, D company | 8 |
| phthalo type, E company | 24 |
| phthalo type, F company | 12 |

FIG. 6

| writing speed | writing power (mW) |
|---|---|
| 8x | 25.0 |
| 12x | 30.5 |
| 16x | 35.3 |
| 20x | 39.5 |
| 24x | 43.3 |

| zone | 1 | 2 | 3 | | | |
|---|---|---|---|---|---|---|
| position(min) | 0 | 1 | 10 | 30 | 50 | 70 |
| servo deviation level | 0 | 0 | 0 | 0 | 0 | 0 |
| original writing speed | 16x | 20x | 24x | 24x | 24x | 24x |
| optimum writing speed | 16x | 20x | 24x | 24x | 24x | 24x |

FIG. 22

| zone | 1 | 2 | 3 | | | |
|---|---|---|---|---|---|---|
| position(min) | 0 | 1 | 10 | 30 | 50 | 70 |
| servo deviation level | 0 | 0 | 0 | 0 | 0 | ~~0~~ 1 |
| original writing speed | 16x | 20x | 24x | 24x | 24x | 24x |
| optimum writing speed | 16x | 20x | 20x | 20x | 20x | 20x |

FIG. 23

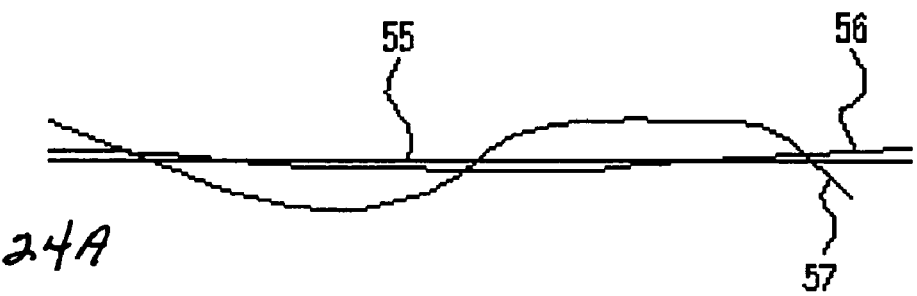
FIG. 24A
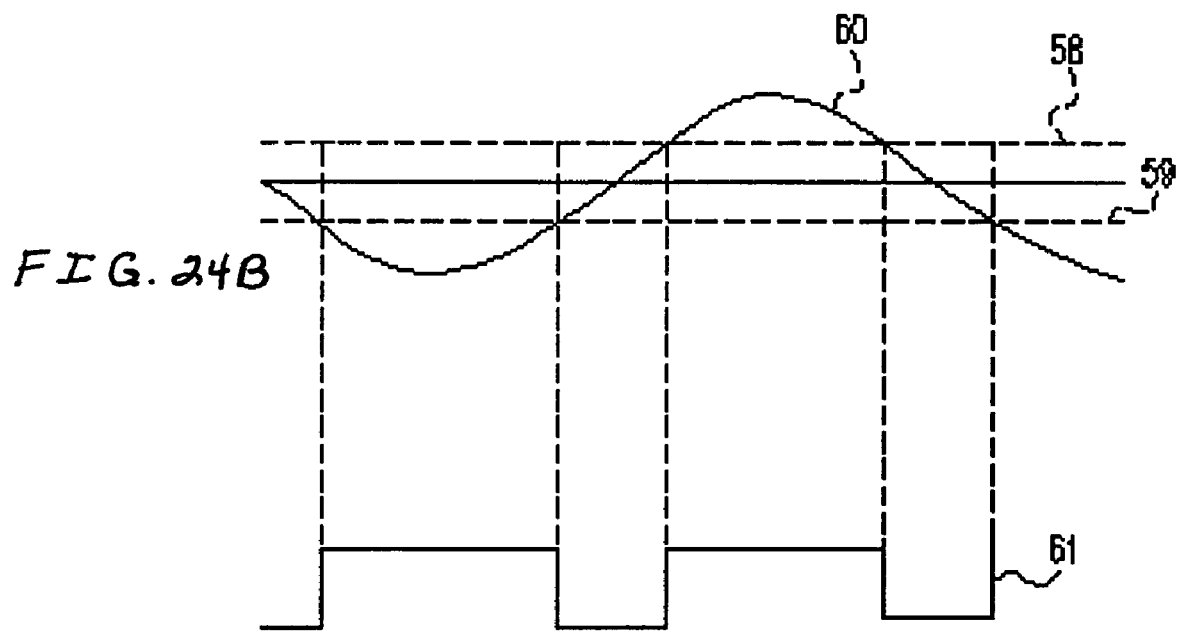
FIG. 24B
FIG. 24C

| Vth(TE) | 16x | 20x | 24x |
|---|---|---|---|
| Level 2 | >20% | >15% | >10% |
| Level 1 | 10-20% | 7.5-15% | 5-10% |
| Level 0 | <10% | <7.5% | <5% |

FIG. 25

| $FE_{p-p}(V)$ | 16x | 20x | 24x |
|---|---|---|---|
| Level 2 | >0.22V | >0.2V | >0.18V |
| Level 1 | 0.14–0.22V | 0.1–0.2V | 0.06–0.18V |
| Level 0 | <0.14V | <0.1V | <0.06V |

FIG. 30

| zone | 1 | 2 | 3 | | | |
|---|---|---|---|---|---|---|
| position(min) | 0 | 1 | 10 | 30 | 50 | 70 |
| TE signal deviation level | 0 | 0 | 0 | 0 | 1 | 1 |
| FE signal deviation level | 0 | 0 | 0 | 0 | 0 | 1 |
| original writing speed | 16x | 20x | 24x | 24x | 24x | 24x |
| optimum writing speed | 16x | 20x | 20x | 20x | 20x | 20x |

FIG. 31

WRITING METHOD FOR OPTICAL DISC, PROCESSING METHOD FOR INFORMATION, OPTICAL DISC APPARATUS, AND INFORMATION PROCESSING APPARATUS

CROSS-REFERENCE TO RELATED APPLICATION

This application is a divisional application of U.S. Ser. No. 10/096,820, filed Mar. 14, 2002, now U.S. Pat. No. 7,012,867, which claims the priority benefit of Japanese application ser. no. 2001-078159, filed on Mar. 19, 2001, 2001-129986, filed on Apr. 26, 2001 and 2001-261036, filed on Aug. 30, 2001, The entireties of which are incorporated herein by reference.

BACKGROUND OF THE INVENTION

1. Field of the Invention

This invention relates in general to a writing method for an optical disc, a processing method for information, an optical disc apparatus, and an information processing apparatus.

2. Description of Related Art

Conventionally, a spiral track is formed on a compact disc (CD) from the inner circumference to the outer circumference. In addition, an example for a data recordable disc is a CD-R (Compact Disc-Recordable) disc. When data is written to the CD-R disc, data is also written on the track with a constant linear density.

In general, the optical disc device for writing information on a writing medium, such as a CD-R/RW (Compact Disc-Recordable/ReWritable) medium having a spiral track thereon, is rotated under a CLV (Constant Linear Velocity) control. For the CLV control, the optical disc is controlled to rotate with a rotational velocity such that the track length passing over an optical pick-up of the optical disc device per unit time is a constant. Therefore, when information is recorded on the inner circumference of the recording medium, the rotational speed of the recording medium is faster, while when information is recorded on the outer circumference of the recording medium, the rotational speed is slower.

As the optical disc apparatus, such as the CD-R/RW, for writing information to an optical disc is used as an external apparatus of a personal computer and becomes popular, a high-speed writing is greatly desired. When the optical disc is written with a high speed, the rotational speed of the optical disc becomes large. Due to influences of the bad mechanical accuracy, the wobbling surface of the optical disc and the eccentricity, etc., a track deviation, which means that the light spot for writing data to the optical disc falls out of the track, occurs easily. When the track deviation occurs during the data writing, the optical disc cannot be used any more. This is a severe problem.

For the CD-R disc, the data writing density of the entire disc surface is the same. When the linear velocity (a relative velocity along the tangent direction of the light spot position on the optical disc) of the light spot for writing/reproducing data on the optical disc is fixed at 1.2 to 1.4 m/s, the channel bit rate of data is 4.3218 MB/sec. The writing speed under such a condition is known as a 1× writing speed, and the optical disc controlled to rotate with a constant linear velocity is known as a CLV (constant linear velocity) writing. Because the CD type disc uses the format above that the linear velocity of data is constant, the writing is performed by the CLV method. Based on the one time speed (1×), the CLV writing is performed with an integer time speed (such as 1×, 2×, 4×, 8×, 12×, 16×, 20×, etc, × is a multiple).

When the data writing is performed by the CLV method, the number of rotations of the optical disc at the inner circumference and the number of rotations of the optical disc at the outer circumference are greatly different. Of course, the number of rotations of the optical disc at the inner circumference is greater than the number of rotations of the optical disc at the outer circumference. In order to suppress the occurrence of the track deviation during the data writing, the entire optical disc has to be written by setting a CLV speed such that the track deviation will not occur at the innerest circumference where the optical disc rotates with a highest speed. In this situation, the number of rotations at the outer circumference of the optical disc has a margin with respect to the track deviation.

In addition to the CLV control, there is still a CAV (Constant Angular Velocity) control such that the optical disc is controlled to rotate with a constant angular velocity. For the CAV control, information is always recorded to the recording medium with a constant rotational velocity of the recording medium, rather than according to a writing position of the recording medium with respect to the optical pick-up.

Recently, the optical disc has become highly competitive in the high-speed application. Because of a spindle motor that drives the optical disc, a high-speed rotation is necessary. For the CLV optical disc, in view of the spindle motor, the optical pick-up has to rotate fast when information is recorded on the inner circumference of the recording medium, and the rotational speed of the recording medium is faster, while the optical pick-up can rotate slowly when information is recorded on the outer circumference of the recording medium. To increase the speed of the spindle motor requires using a motor, a driver, and circuits for the high-speed demand. Accordingly, it is obvious that the system itself becomes larger and the cost goes up.

To solve the above problems, a ZCLV (Zoned CLV) control is made practicable. For the ZCLV control, the writing speed at the inner circumference of the recording medium (the optical disc) is slowed. When information is recorded on an outer circumference from certain position of the recording medium, the writing speed is increased. Namely, when information is recorded on the innermost circumference of the recording medium, the spindle motor rotates with a high speed. Therefore, as the writing position is moved to the outer circumference of the recording medium, the rotation of the spindle motor is continuously slowed because of the CLV control.

According to the ZCLV method, the writing area of the optical disc is divided into zones, such as the inner circumference, the middle circumference and the outer circumference, the CLV writing speed for each zone is set such that a continuous writing is made possible, by which the mechanism can implement a high-speed writing. FIG. 2 shows an example for implementing the ZCLV writing according to the above technology. In FIG. 2, the horizontal axis stands for the position (time) of the optical disc and the vertical axis stands for the writing speed. In this example, the optical disc is divided into three zones (Lead-In to t1, t1 to t2, and t2 to Lead-Out), and the CLV velocities for the tree zones are set to S1, S2 and S3, respectively for writing data. At the zone joint t1, t2, a technology disclosed by Japanese Laid Open H10-49990 can be used to maintain the data continuity.

For the general CLV method, the rotational speed of the spindle motor is continuously decreased from the innermost circumference to the outermost circumference. However, for the ZCLV method, once the writing is interrupted at a certain position, the writing speed is increased. Namely, the rotational speed of the spindle motor is increased at that position. As the rotational speed of the spindle motor is increased, the writing is restarted. Then, information is written to the optical disc toward the outer circumference and the rotational speed of the spindle motor is continuously decreased during this period. By repeatedly performing the process for a predetermined time, the spindle motor can rotate with a higher speed until data is written to the outer circumference of the optical disc.

In addition, because the density of information written to the optical disc of the entire track is the same, the track length passing over the optical pick-up per unit time is easily understood. Assuming the writing speed from the inner circumference to the outer circumference of the optical disc is increased twice, the relationship between the writing position on the disc and the rotational speed of the spindle motor is shown in FIG. 2. In the above ZCLV method, the upper limit of the rotational speed of the spindle motor can be put to a certain value and a higher writing speed is possible.

Conventionally an optical disc writing method for optimizing the writing speed is provided. The spiral track on the optical disc is divided into a plurality of zones, and the data writing to each zone is performed with a different CLV writing speed. In the ZCLV writing method, a plurality of writing modes is set. In each writing mode, zone dividing times for dividing the zones and CLV writing speeds for each of zones are used as zone parameters and stored in a memory. Before writing, the type of the optical disc is determined by a disc-type determining device, and according to result, the zone parameters suitable for the disc type are selected among the plurality of zone parameters from the memory. Then, the ZCLV writing is performed under a writing mode corresponding to the selected zone parameters.

Japanese Laid Open H07-93873 or H11-66726 discloses a writing method by the ZCLV method for an optical disc where zones exist. Regarding this method, for an optical disc consisting of only one spiral track, such as the CD-R disc, because the zones are not divided in advance, the ZCLV writing cannot be used.

For the ZCLV method, because the optical discs are made by different corporations and countries, their characteristics, such as the eccentricity and the burred surface, are also different. When an optical disc with bad characteristic is used in the disc apparatus and the rotates with a high speed, the follow controls of the focusing servo and the tracking servo will fail and the data writing cannot be performed with a high writing speed. In the above writing method, when the optical disc to which data is written cannot be written with a high writing speed, this situation will be detected so that the zone parameters, which are capable of writing data with a highest speed among all possible writing speeds for the optical disc, can be selected among the finite number of the zone parameters stored in the memory.

In the optical disc apparatus, the writing power is different and dependent on the type of the optical disc. The reason is that the writing characteristic is greatly different due to the different material of the recording film, the film pressure, and the physical aspects of the width and the depth of the track, etc. In order to match the writing characteristic of the optical disc, the width of the writing pulse is adjusted for each type of optical disc.

In addition, the writing power is also different according to the CLV speed during the data writing. In general, if the writing power is proportional to the root of the CLV speed, the width of the writing pulse is adjusted for each type of optical disc. The writing power varies with and greatly depends on the disc type and the CLV speed.

In addition, the mechanical characteristic is also different according to the disc type because of the sputtering accuracy, the punching accuracy and the process manage target etc that the disc maker uses. If the mechanical characteristic of the optical disc is worse, there is danger due to the track deviation when the optical disc rotates with a high speed. When the high-speed writing is performed by the ZCLV method, it has to avoid the writing interrupt due to the track deviation. Therefore, the writing speed has to be determined according to a trade-off with the mechanical characteristic of the optical disc.

Considering the mechanical variations due to the disc type, it becomes a problem to provide a method for determining the zone region t1, t2, and their corresponding CLV speed (writing speed) such that the data writing to the optical disc can be performed with a highest speed and a highly reliable writing without track deviation can be performed to the optical disc.

Even if the optical discs are the same type, the writing sensitivity and the mechanical characteristic are dispersed due to the unevenness of the manufacturing conditions. Regarding the optical disc apparatus, because of the unevenness of the assemble accuracy, the chucking accuracy (a shifting amount between the center of the optical disc and the rotational center of the driving motor) when the optical disc is loaded is also uneven, and the relative mechanical accuracy of the optical disc becomes uneven too. In addition, due to the unevenness of the wavelength of the semiconductor laser, the writing sensitive characteristic is also uneven. Due to the unevenness of the manufacturing conditions, the maximum possible writing speed is also uneven. To really detect the variation of the maximum writing speed due to the manufacture unevenness, the maximum writing speed has to be set.

According to above writing method, the number of the zone parameters stored in the memory is finite. The zone parameters are only generated on an assumption of several parameters. As for the optical disc, even though the zone parameters have a writable speed without causing the track deviation, it cannot be used as zone parameters capable of performing at highest writing speed.

When the optimum writing speed is determined and set by the optical disc apparatus, the data writing to the optical disc will be performed with a speed different from the speed that is set with a writing software by the user. At this time, when the writing speed is lower than the writing speed set by the user, the writing operation does not complete even though the preset writing time has passed, the ill condition for the optical disc apparatus occurs and the personal computer may hang up.

When the optimum writing speed is determined and set by the optical disc apparatus, the data writing to the optical disc will be performed with a speed different from the speed that is set with a writing software by the user. At this time, the preset writing complete time is unknown. In addition, the user cannot set the writing speed to try to use the optical disc apparatus. For example, if the user has many of the same optical discs, the limit of the writing speed cannot be found by experiment.

SUMMARY OF THE INVENTION

According to the foregoing description, an object of the invention is to provide an optical disc writing method and an optical writing apparatus, wherein the ZCLV zones can be set to match the mechanical characteristic and the writing characteristic for each disc type, and high-speed writing can be performed without causing track deviation.

It is an object of the invention to provide an information processing method and an information processing apparatus, wherein the user can know that the actual writing speed is different from the writing speed set by the user, the user can predict the writing complete time, and the user can also perform the experimental test writing.

It is an object of the invention to provide an optical disc writing method and an optical writing apparatus, wherein both stable writing and high-speed writing can be achieved. In addition, the writing can be performed at the highest speed without failure in the writing and without losing the writing quality.

It is an object of the invention to provide a writing method for an optical disc and an optical disc apparatus, wherein the ZCLV zone regions can be set to match the mechanical characteristic and writing power characteristic for each type of the optical disc, so that a high-speed writing can be performed without causing track deviation.

It is an object of the invention to provide an information processing method and an information processing apparatus, wherein the user can be informed that the writing speed set by the user and the actual writing speed are different so that the user can predict the writing finish time. In addition, the user can perform experimental test writings.

It is an object of the invention to provide a writing method for an optical disc and an optical disc apparatus, in which both the stable writing and the high-speed writing are satisfied. In addition, the writing can be performed at the highest writing speed without failure in writing and without losing the writing quality.

It is an object of the invention to provide a writing method for an optical disc and an optical disc apparatus, wherein when the ZCLV writing is performed, the writing speed for each zone is optimized, and high-speed writing is possible without causing servo deviation.

It is an object of the invention to provide a writing method for an optical disc and an optical disc apparatus, wherein the writing can be performed with an optimum writing speed for each maker or media type of optical disc.

It is an object of the invention to provide a writing method for an optical disc and an optical disc apparatus, wherein the CLV writing can also be performed if the zones are not set on the optical disc.

It is an object of the invention to provide a writing method for an optical disc and an optical disc apparatus, wherein by reducing the writing speed by a predetermined level according to the level of the servo signal deviation, high-speed writing can be performed without causing servo deviation.

It is an object of the invention to provide a writing method for an optical disc and an optical disc apparatus, wherein the writing can be performed with an optimum writing power corresponding to the writing speed.

It is an object of the invention to provide a writing method for an optical disc and an optical disc apparatus, wherein the servo follow can be examined by examining the servo signal deviation in the tracking direction, in the focusing direction, or in both the focusing and the tracking direction.

It is an object of the invention to provide a writing method for an optical disc and an optical disc apparatus, wherein when the actual writing speed and the writing speed expected by the user are different, the user can be informed of information.

According to the objects mentioned above, the invention provides a writing method for an optical disc to optimize a writing speed, wherein a spiral track on the optical disc is divided into a plurality of zones, and different CLV writing speeds are used for performing a ZCLV writing to the zones respectively, the writing method comprising steps of: setting a plurality of writing modes; storing a plurality of zone parameter sets for the writing modes respectively in memory, wherein each of the zone parameters sets comprises dividing times for dividing the zones, and the different CLV writing speeds for the zone respectively; determining a disc type of the optical disc by a disc type determining device before the ZCLV writing is performed; selecting one of the zone parameter sets that is suitable to the disc type of the optical disc; and performing the ZCLV writing with the writing mode corresponding to the selected zone parameter set.

The invention further provides a writing method for an optical disc to optimize a writing speed, wherein a spiral track on the optical disc is divided into a plurality of zones, and different CLV writing speeds are used for performing a ZCLV writing to the zones respectively, the writing method comprising steps of: setting a plurality of writing modes; storing a plurality of zone parameter sets for the writing modes respectively in a memory, wherein each of the zone parameter sets comprises dividing times for dividing the zones, and the different CLV writing speeds for the zone respectively; performing a test writing to the optical disc at an initial writing stage to obtain a test result; selecting one of the zone parameter sets according to the test result; and performing the ZCLV writing with the writing mode corresponding to the selected zone parameter set.

The invention further provides a writing method for an optical disc to optimize a writing speed, wherein a spiral track on the optical disc is divided into a plurality of zones, and different CLV writing speeds are used for performing a ZCLV writing to the zones respectively, the writing method comprising steps of: setting a plurality of writing modes; storing a plurality of zone parameter sets for the writing modes respectively in a memory, wherein each of the zone parameter sets comprises dividing times for dividing the zones, and the different CLV writing speeds for the zone respectively; accessing the optical disc before a writing to obtain an access error result; selecting one of the zone parameter sets according to the access error result; and performing the ZCLV writing with the writing mode corresponding to the selected zone parameter set.

The invention further provides a writing method for an optical disc to optimize a writing speed, wherein a spiral track on the optical disc is divided into a plurality of zones, and different CLV writing speeds are used for performing a ZCLV writing to the zones respectively, the writing method comprising steps of: setting a plurality of writing modes; storing a plurality of zone parameter sets for the writing modes respectively in a memory, wherein each of the zone parameter sets comprises dividing times for dividing the zones, and the different CLV writing speeds for the zone respectively; accessing the optical disc before a writing to detect a servo signal deviation; selecting one of the zone parameter sets according to the servo signal deviation; and performing the ZCLV writing with the writing mode corresponding to the selected zone parameter set.

The invention further provides an information processing method, using the writing method for an optical disc of any one of claims 1 to 4 to obtain an optimum writing speed, the method comprising steps of: informing the optimum writing speed to a host computer or a write software; and displaying, by the host computer or the write software using the informed optimum writing speed, that to set a writing speed higher than the informed optimum writing speed is impossible, or that when a writing speed higher than the informed optimum writing speed is selected, the writing speed is changed to the informed optimum writing speed and the writing method is performed under a limit of the optimum writing speed. In addition, the optimization of the writing speed is selectable by the host computer or the write software.

The invention further provides an optical disc apparatus capable of optimizing a writing speed, wherein a spiral track on the optical disc is divided into a plurality of zones, and different CLV writing speeds are used for performing a ZCLV writing to the zones respectively, the optical disc apparatus comprising: means for storing a plurality of writing modes; means for storing a plurality of zone parameter sets for the writing modes respectively, wherein each of the zone parameter sets comprises dividing times for dividing the zones, and the different CILV writing speeds for the zone respectively; means for determining a disc type of the optical disc before the ZCLV writing is performed; means for selecting one of the zone parameter sets from the memory, wherein the selected zone parameter set is suitable to the disc type of the optical disc; and means for performing the ZCLV writing with the writing mode corresponding to the selected zone parameter set.

The invention further provides an optical disc apparatus capable of optimizing a writing speed, wherein a spiral track on the optical disc is divided into a plurality of zones, and different CLV writing speeds are used for performing a ZCLV writing to the zones respectively, the optical disc apparatus comprising: means for storing a plurality of writing modes; a memory for storing a plurality of zone parameter sets for the writing modes respectively, wherein each of the zone parameter sets comprises dividing times for dividing the zones, and the different CLV writing speeds for the zone respectively; means for performing a test writing to the optical disc at an initial writing stage to obtain a test result; means for selecting one of the zone parameter sets from the memory according to the test result; and means for performing the ZCLV writing with the writing mode corresponding to the selected zone parameter set.

The invention further provides an optical disc apparatus capable of optimizing a writing speed, wherein a spiral track on the optical disc is divided into a plurality of zones, and different CLV writing speeds are used for performing a ZCLV writing to the zones respectively, the optical disc apparatus comprising: means for storing a plurality of writing modes; a memory for storing a plurality of zone parameter sets for the writing modes respectively, wherein each of the zone parameter sets comprises dividing times for dividing the zones, and the different CLV writing speeds for the zone respectively; means for accessing the optical disc before a writing to obtain an access error result; means for selecting one of the zone parameter sets according to the access error result; and means for selecting one of the zone parameter sets from the memory according to the access error result; and means for performing the ZCLV writing with the writing mode corresponding to the selected zone parameter set.

The invention further provides an optical disc apparatus capable of optimizing a writing speed, wherein a spiral track on the optical disc is divided into a plurality of zones, and different CLV writing speeds are used for performing a ZCLV writing to the zones respectively, the optical disc apparatus comprising: means for storing a plurality of writing modes; a memory for storing a plurality of zone parameter sets for the writing modes respectively, wherein each of the zone parameter sets comprises dividing times for dividing the zones, and the different CLV writing speeds for the zone respectively; means for accessing the optical disc before a writing to obtain a servo signal deviation; means for selecting one of the zone parameter sets from the memory according to the servo signal deviation; and means for performing the ZCLV writing with the writing mode corresponding to the selected zone parameter set.

The invention further provides an information processing apparatus, using any one of the optical disc apparatuses above capable of obtaining an optimum writing speed, the apparatus comprising: means for informing the optimum writing speed to a host computer or a write software; and means for displaying, by the host computer or the write software using the informed optimum writing speed, that to set a writing speed higher than the informed optimum writing speed is impossible, or that when a writhing speed higher than informed optimum writing speed is selected, the writing speed is changed to the informed optimum writing speed and the writing method is performed under a limit of the optimum writing speed.

The information processing apparatus further comprises means for measuring a data transfer rate during the writing to report a writing speed or an average writing speed during the writing, or an average writing speed, a maximum writing speed or a minimum writing speed after the writing. The apparatus further comprises means for selectably optimizing the writing speed at the host computer or in the write software.

The invention further provides an optical disc apparatus for writing a data to an optical disc by a ZCLV (zoned constant linear velocity) method, comprising a changing device for changing a position, where a writing speed for the optical disc is changed, according to a disc characteristic for writing.

The changing device determines the position, where a writing speed for the optical disc is changed, according to an ATIP information that is stored on the optical disc in advance. The changing device determines the position, where a writing speed for the optical disc is changed, according to a servo status with respect to the optical disc. The changing device determines the position, where a writing speed for the optical disc is changed, according to a capacity of the optical disc.

The invention further provides a writing method for an optical disc, wherein a spiral track on the optical disc is divided into a plurality of zones, and different CLV (constant linear velocity) writing speeds are used for performing a ZCLV (zoned CLV) writing to the zones respectively, the writing method comprising steps of: obtaining an amplitude information of a focusing error signal with respect to the optical disc when a writing is performed; and calculating dividing times for the zones in real time according to the amplitude information of the focusing error signal.

The invention further provides a writing method for an optical disc, wherein a spiral track on the optical disc is divided into a plurality of zones, and different CLV (constant linear velocity) writing speeds are used for performing a ZCLV (zoned CLV) writing to the zones respectively, the writing method comprising steps of: obtaining an amplitude information of a tracking error signal with respect to the optical disc when a writing is performed; and calculating dividing times for the zones in real time according to the amplitude information of the tracking error signal.

The invention further provides a writing method for an optical disc, wherein a spiral track on the optical disc is divided into a plurality of zones, and different CLV (constant linear velocity) writing speeds are used for performing a ZCLV (zoned CLV) writing to the zones respectively, the writing method comprising steps of: obtaining a power variation information of a running OPC result with respect to the optical disc when a writing is performed; and calculating dividing times for the zones in real time according to the power variation information.

The invention further provides a writing method for an optical disc, wherein a spiral track on the optical disc is divided into a plurality of zones, and different CLV (constant linear velocity) writing speeds are used for performing a ZCLV (zoned CLV) writing to the zones respectively, the writing method comprising steps of: obtaining amplitude information of a tracking error signal and a focusing error signal with respect to the optical disc when a writing is performed; and calculating dividing times for the zones in real time according to the amplitude information of the tracking error signal and the focusing error signal.

The invention further provides a writing method for an optical disc, wherein a spiral track on the optical disc is divided into a plurality of zones, and different CLV (constant linear velocity) writing speeds are used for performing a ZCLV (zoned CLV) writing to the zones respectively, the writing method comprising steps of: obtaining amplitude information of a tracking error signal and a focusing error signal with respect to the optical disc when a writing is performed; and obtaining a power variation information of a running OPC result with respect to the optical disc when a writing is performed; and calculating dividing times for the zones in real time according to the amplitude information of the tracking error signal and the focusing error signal as well as the power variation information.

The invention further provides an optical disc apparatus capable of optimizing a writing speed, wherein a spiral track on an optical disc is divided into a plurality of zones, and different CLV (constant linear velocity) writing speeds are used for performing a ZCLV (zoned CLV) writing to the zones respectively, the apparatus comprising: means for obtaining an amplitude information of a focusing error signal with respect to the optical disc when a writing is performed; means for determining whether a next zone is switched to according to the amplitude information of the focusing error signal; means for calculating dividing times for the zones when the next zone is switched to; means for generating zone parameters based on the dividing times; and means for performing the ZCLV writing with a writing mode corresponding to the zone parameters.

The invention further provides an optical disc apparatus capable of optimizing a writing speed, wherein a spiral track on an optical disc is divided into a plurality of zones, and different CLV (constant linear velocity) writing speeds are used for performing a ZCLV (zoned CLV) writing to the zones respectively, the apparatus comprising: means for obtaining an amplitude information of a tracking error signal with respect to the optical disc when a writing is performed; means for determining whether a next zone is switched to according to the amplitude information of the tracking error signal; means for calculating dividing times for the zones when the next zone is switched to; means for generating zone parameters based on the dividing times; and means for performing the ZCLV writing with a writing mode corresponding to the zone parameters.

The invention further provides an optical disc apparatus capable of optimizing a writing speed, wherein a spiral track on an optical disc is divided into a plurality of zones, and different CLV (constant linear velocity) writing speeds are used for performing a ZCLV (zoned CLV) writing to the zones respectively, the apparatus comprising: means for obtaining a power variation information of a running OPC result with respect to the optical disc when a writing is performed; means for determining whether a next zone is switched to according to the power variation information; means for calculating dividing times for the zones when the next zone is switched to; means for generating zone parameters based on the dividing times; and means for performing the ZCLV writing with a writing mode corresponding to the zone parameters.

The invention further provides an optical disc apparatus capable of optimizing a writing speed, wherein a spiral track on an optical disc is divided into a plurality of zones, and different CLV (constant linear velocity) writing speeds are used for performing a ZCLV (zoned CLV) writing to the zones respectively, the apparatus comprising: means for obtaining amplitude information of a focusing error signal and a tracking error signal with respect to the optical disc when a writing is performed; means for determining whether a next zone is switched to according to the amplitude information of the focusing error signal and the tracking error signal; means for calculating dividing times for the zones when the next zone is switched to; means for generating zone parameters based on the dividing times; and means for performing the ZCLV writing with a writing mode corresponding to the zone parameters.

The invention further provides an optical disc apparatus capable of optimizing a writing speed, wherein a spiral track on an optical disc is divided into a plurality of zones, and different CLV (constant linear velocity) writing speeds are used for performing a ZCLV (zoned CLV) writing to the zones respectively, the apparatus comprising: means for obtaining amplitude information of a focusing error signal and a tracking error signal with respect to the optical disc when a writing is performed, and for obtaining a power variation information of a running OPC result with respect to the optical disc when a writing is performed; means for determining whether a next zone is switched to according to the amplitude information of the focusing error signal and the tracking error signal, as well as the means for calculating dividing times for the zones when the next zone is switched to; means for generating zone parameters based on the dividing times; and means for performing the ZCLV writing with a writing mode corresponding to the zone parameters.

The invention further provides an optical disc apparatus, wherein a light is emitted from a light emitting element to write data on a write-once type or a rewritable optical disc that is driven to rotate, the apparatus comprising: a motor for rotationally driving the optical disc; a servo driving device capable of driving the motor such that the optical disc is rotated in a CLV (constant linear velocity) manner; a first table for storing a plurality of writing modes corresponding to a plurality of positions of zones (zone positions) and writing speeds when a writing is performed for the zones respectively, wherein a writable region of the optical disc is divided into the zones from an inner circumference to an outer circumference; a second table for storing a plurality of disc types of the optical disc and the writing modes each of which corresponds to one disc type of the optical disc; a disc type determining device for determining the disc type of the optical disc; a position detecting device for detecting a position on the optical disc; a writing mode setting device such that the writing mode corresponding to determined disc type is read from the second table and the writing mode read from the first table is set as a writing mode for writing to the optical disc; a CLV controlling device for controlling the servo driving device such that according to the set writing mode, a zone is determined from the position detected by the position detecting device, and then a data writing is performed for the zone with the writing speed set for the zone; a deviation detecting device for detecting a servo signal deviation of the servo driving device with the writing speed set by the writing mode setting device; and a first speed reducing device for reducing the writing speed by the CLV controlling device when controlling the servo driving device according to the detected deviation.

Accordingly, when the writing is performed to the optical disc, the servo follow can be examined with the writing speed for actually performing the writing to each zone. Because the variation due to the manufacturing dispersion of the optical disc can be absorbed, and the writing speed for each zone is optimized, therefore a high-speed writing can be performed without causing the track deviation.

The disc-type determining device is used for determining a maker or a media type of the optical disc. Therefore, the writing can be performed with an optimum writing speed for each maker or the media type of the optical disc.

The first table stores the writing modes wherein for each writing mode, when the zone positions are not set, the writing is performed with a single writing speed, and when the zone positions are set, the writing to each zone is performed with the writing speed corresponding to each zone. When the zones are not set in the writing mode set by the writing mode setting device, the CLV controlling device controls the servo driving device so that the data writing is performed by the CLV manner with the single writing speed to the optical disc; and when the zones are set in the writing mode set by the writing mode setting device, the CLV controlling device determines the zones according to the zone positions detected by the position detecting device and then controls the servo driving device so that the data writing is performed to each zone by the CLV manner with the writing speed set for each zone. When the zones are not set in the writing mode set by the writing mode setting device, the deviation detecting device detects the servo signal deviation of the servo driving device with the single writing speed; and when the zones are set in the writing mode set by the writing mode setting device, the deviation detecting device detects the servo signal deviation of the servo driving device with the writing speed set for each zone. Therefore, the CLV writing can be also performed if the zones are not set on the optical disc.

The first speed reducing device reduces the writing speed by a predetermined level according to the level of the servo signal deviation. Therefore, by reducing the writing speed by a predetermined level according to the level of the servo signal deviation, a high speed writing can be performed without causing the servo deviation.

The above optical disc apparatus can further comprise a power controlling device for controlling a writing power of a beam emitted from an optical pick-up according to the reduced writing speed. Therefore, the writing can be performed with an optimum writing power corresponding to the writing speed.

The above optical disc apparatus further comprises an OPC executing device for executing an OPC operation with a predetermined writing speed before the deviation detecting device starts to detect; an OPC determining device for determining whether the OPC operation completed normally; an OPC re-executing device for re-executing the OPC operation by the OPC executing with a writing speed reduced by the predetermined writing speed, when the OPC operation did not complete normally; a second speed reducing device for replacing the writing speed that is set by the writing mode setting device by a writing speed when the servo signal deviation is detected by the deviation detecting device to therefore set a writing speed during the OPC operation such that the OPC operation is determined to be completed normally, when the OPC operation is re-executed. Therefore, even if the optical disc is bad in quality, the servo follow can be examined without causing the servo deviation because the writing speed at which the optical disc can rotate with a highest speed to finish the OPC operation at the innermost circumference and the servo follow of the disc surface is checked.

The optical disc apparatus further comprises a light receiving element for receiving a reflection beam reflected by the optical disc; and a tracking error signal generating device for generating a tracking error signal used for detecting a tracking error of the optical disc from the light receiving element, wherein the deviation detecting device uses the tracking error signal to detect the servo signal deviation of the servo driving device. Therefore, the servo follow can be examined by examining the servo signal deviation in the tracking direction.

The above optical disc apparatus can further comprise a light receiving element for receiving a reflection beam reflected by the optical disc; a focusing error signal generating device for generating a focusing error signal used for detecting a focusing error of the optical disc from the light receiving element, wherein the deviation detecting device uses the focusing error signal to detect the servo signal deviation of the servo driving device. Therefore, the servo follow can be examined by examining the servo signal deviation in the focusing direction.

The optical disc apparatus further comprises a light receiving element for receiving a reflection beam reflected by the optical disc; a tracking error signal generating device for generating a tracking error signal used for detecting a tracking error of the optical disc from the light receiving element; and a focusing error signal generating device for generating a focusing error signal used for detecting a focusing error of the optical disc from the light receiving element, wherein the deviation detecting device uses the tracking error signal and the focusing error signal to detect the servo signal deviation of the servo driving device. Therefore, the highly reliable servo follow can be examined by examining the servo signal deviation in the focusing direction and in the tracking direction.

The optical disc apparatus further comprises an acknowledging device for outputting a signal to inform a fact when the writing speed to control the servo driving device is reduced by the first speed reducing device. Therefore, when the actual writing speed and the writing speed expected by the user are different, information can be informed to the user.

The invention further provides an information processing apparatus, comprising the optical disc apparatus of any one of claims 28 to 37 to write data to the write-once type or the rewritable optical disc.

The invention further provides a writing method for an optical disc, wherein a light is emitted from a light emitting element to write data on a write-once type or a rewritable optical disc that is driven to rotate, the apparatus comprising: a disc type determining process for determining the disc type of the optical disc; a writing mode setting device such that the writing mode corresponding to a determined disc type is read from the second table and the writing mode read from the first table is set as a writing mode for writing the optical disc by referring to a first table and a second table, wherein the first table is used for storing a plurality of writing modes corresponding to a plurality of positions of zones (zone positions) and writing speeds when a writing is performed for the zones respectively, wherein a writable region of the optical disc is divided into the zones from an inner circumference to an outer circumference; and the second table is used for storing a plurality of disc types of the optical disc and the writing modes, each of which corresponds to one disc type of the optical disc; a CLV controlling process for controlling the servo driving device such that according to the set writing mode, a zone is determined from the position detected by the position detecting device, and then a data writing is performed for the zone with the writing speed set for the zone; a deviation detecting process for detecting a servo signal deviation of the servo driving device with the writing speed set by the writing mode setting device; and a first speed reducing process for reducing the writing speed by the CLV controlling device when controlling the servo driving device according to the detected deviation.

Accordingly, when the writing is performed to the optical disc, the servo follow can be examined with the writing speed for actually performing the writing to each zone. Because the variation due to the manufacturing dispersion of the optical disc can be absorbed, and the writing speed for each zone is optimized, therefore a high speed writing can be performed without causing the track deviation.

The disc-type determining process is used for determining a maker or a media type of the optical disc. Therefore, the writing can be performed with an optimum writing speed for each maker or the media type of the optical disc.

The first table stores the writing modes wherein for each writing mode, when the zone positions are not set, the writing is performed with a single writing speed, and when the zone positions are set, the writing to each zone is performed with the writing speed corresponding to each zone; wherein when the zones are not set in the writing mode set by the writing mode setting device, the CLV controlling process controls the servo driving process so that the data writing is performed by the CLV manner with the single writing speed to the optical disc; and when the zones are set in the writing mode set by the writing mode setting process, the CLV controlling process determines the zones according to the zone positions detected by the position detecting process and then controls the servo driving process so that the data writing is performed to each zone by the CLV manner with the writing speed set for each zone; and wherein when the zones are not set in the writing mode set by the writing mode setting process, the deviation detecting process detects the servo signal deviation of the servo driving process with the single writing speed; and when the zones are set in the writing mode set by the writing mode setting process, the deviation detecting process detects the servo signal deviation of the servo driving process with the writing speed set for each zone. Therefore, the CLV writing can be also performed if the zones are not set on the optical disc.

The first speed reducing process reduces the writing speed by a predetermined level according to the level of the servo signal deviation. Therefore, by reducing the writing speed by a predetermined level according to the level of the servo signal deviation, a high speed writing can be performed without causing the servo deviation.

The method further comprises a power controlling process for controlling a writing power of a beam emitted from an optical pick-up according to the reduced writing speed. Therefore, the writing can be performed with an optimum writing power corresponding to the writing speed.

The method further comprises an OPC executing process for executing an OPC operation with a predetermined writing speed before the deviation detecting process starts to detect; an OPC determining process for determining whether the OPC operation is normally complete; an OPC re-executing process for re-executing the OPC operation by the OPC executing with a writing speed reduced by the predetermined writing speed, when the OPC operation is not normally complete; a second speed reducing process for replacing the writing speed that is set by the writing mode setting process by a writing speed when the servo signal deviation is detected by the deviation detecting process to therefore set a writing speed during the OPC operation that the OPC operation is determined to be normally completed, when the OPC operation is re-executed. Therefore, even if the optical disc is bad in quality, the servo follow can be examined without causing the servo deviation because the writing speed at which the optical disc can rotate with a highest speed to finish the OPC operation at the innerest circumference and the servo follow of the disc surface is checked.

The method further comprises a light receiving process for receiving a reflection beam reflected by the optical disc; and a tracking error signal generating process for generating a tracking error signal used for detecting a tracking error of the optical disc from a light receiving element, wherein the deviation detecting process uses the tracking error signal to detect the servo signal deviation of the servo driving process. Therefore, the servo follow can be examined by examining the servo signal deviation in the tracking direction.

The method further comprises a light receiving process for receiving a reflection beam reflected by the optical disc; a focusing error signal generating process for generating a focusing error signal used for detecting a focusing error of the optical disc from a light receiving element, wherein the deviation detecting process uses the focusing error signal to detect the servo signal deviation of the servo driving process. Therefore, the servo follow can be examined by examining the servo signal deviation in the focusing direction.

The method further comprises a light receiving process for receiving a reflection beam reflected by the optical disc; and a tracking error signal generating process for generating a tracking error signal used for detecting a tracking error of the optical disc from a light receiving element; a focusing error signal generating process for generating a focusing error signal used for detecting a focusing error of the optical disc from a light receiving element, wherein the deviation detecting process uses the tracking error signal and the focusing error signal to detect the servo signal deviation of the servo driving process. Therefore, the highly reliable servo follow can be examined by examining the servo signal deviation in the focusing direction and in the tracking direction.

The method above further comprises an acknowledging process for outputting a signal to inform a fact when the writing speed to control the servo driving process is reduced by the first speed reducing process. Therefore, when the actual writing speed and the writing speed expected by the user are different, information can be informed to the user.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIG. 3 shows an example of a zone dividing table;

FIG. 4 is a table showing the writing mode suitable for each disc type according to the embodiment of the invention;

FIG. 6 is a table showing the maximum writing speed for each disc type according to the embodiment of the invention;

FIG. 19 shows a table for explaining a process executed by the optical disc apparatus;

FIG. 22 shows a table for explaining a process executed by the optical disc apparatus;

FIG. 23 shows a table for explaining a process executed by the optical disc apparatus;

FIGS. 24A to 24C are graphs for explaining the servo check operation;

FIG. 25 is a graph for explaining the servo check operation;

FIG. 30 is a graph for explaining the servo check operation according to another embodiment of the invention; and FIG. 31 is a graph for explaining the servo check operation according to another embodiment of the invention.

DESCRIPTION OF THE PREFERRED EMBODIMENT

Figure 1:
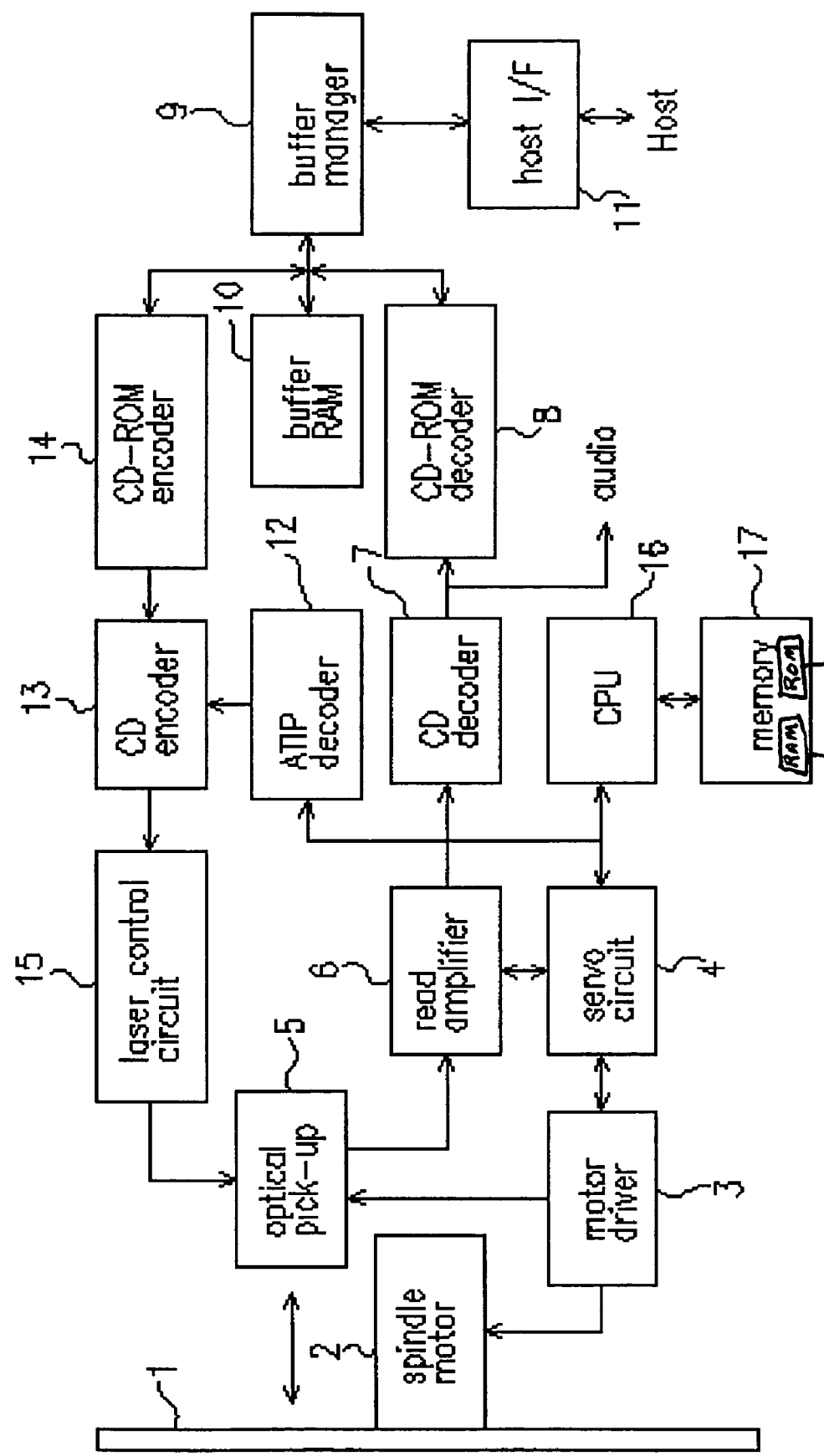
FIG. 1 shows a schematic block diagram according to the embodiment of the invention.

FIG. 1 shows a schematic block diagram according to the embodiment of the invention. The optical disc apparatus in the embodiment is used for writing and/or reproducing information on an optical disc 1, such as the CD-RW. The optical disc 1 is driven to rotate by a spindle motor 2. The spindle motor 2 is driven and controlled by a motor driver 3 and a servo circuit 4 such that the optical disc 1 is rotated under the CLV or the ZCLV control.

An optical pick-up 5 emits a laser beam from a laser source, such as a laser diode. The laser beam is focused by an objective lens onto a recording surface of the optical disc 1 (the recording medium). An actuator is controlled by the servo circuit 4 to perform a focusing servo control and a tracking servo control, thereby generating a reproducing signal to reproduce data recorded on the optical disc 1, or writing data on the optical disc 1.

When reproducing data, the reproducing signal obtained by the optical pick-up 5 is amplified by a read amplifier 6 and then digitized to a binary value. Thereafter, a de-interleaving process and an error correcting process are performed by a CD decoder 7. An error correcting process is further performed for data from the CD decoder 7 by a CD-ROM decoder 8 for increasing the data reliability.

Data from the CD-ROM decoder 8 is then temporally stored in a buffer RAM 10 by a buffer manager 9. When sector data in the buffer RAM 10 is ready, sector data is entirely transmitted to a host (host computer, personal computer) through a host interface (host I/F) 11, such as an ATAPI or a SCSI interface. In addition, when data is music data, data from the CD-decoder 7 is converted to an analog audio signal by a D/A converter.

On the other hand, during the data writing, once data that is transmitted from the host through the host I/F 11, and is stored in the buffer RAM 10 by the buffer manager 9, the data writing process starts. Before the data writing process, the CPU (central processing unit) 16 controls each element of the embodiment to perform a so-called optimum power calibration (OPC) at a test writing area, known as a power calibrating area (PCA) of the optical disc 1, and thereby to calculate and set an optimum writing power.

When data is written to the optical disc, the writing is performed by a CLV method such that the writing linear speed is constant. However, the linear speed can be altered by level (or by step) as described below. The base linear speed is 1.2 to 1.4 mm/sec and is used as a data pattern for writing the EFM (eight-to-fourteen modulation) pulse to the optical disc so as to perform the data writing. The EFM signal modulates an interleaved eight bit data to a fourteen bit data. In fact, in order to increase the writing speed, the writing is performed with a linear speed that is an integer time of the base linear speed (such as 1×, 2×, 4×, 8× or 12×, etc). The optical disc apparatus 1 has a plurality of writing modes. However, even if the data writing is in process, the optical disc apparatus can alter its writing speed.

Before writing data, the laser beam spot on the optical disc 1 is positioned to a write start position. The write start position is obtained according to a ATIP (absolute time in pre-groove) signal that is a wobble signal engraved on the optical disc 1 in advance according the wobble of the track (pre-groove) on the optical disc. The ATIP signal is time information showing absolute location numbers on the optical disc 1, and read from the read amplifier 6 by an ATIP decoder. At the same time, an ATIP signal error is detected to measure the error detecting rate of the ATIP signal.

In addition, a synchronized signal generated by the ATIP decoder 12 is input to the CD encoder 13 such that data can be written into the proper location. When writing data, data is read from the buffer RAM. Thereafter, an error correct code is added to data by the CD-ROM encoder 14 and the CD encoder 13, or an interleaving process is executed for data. Finally, data is recorded to the optical disc 1 through a laser controlling circuit 15 and the optical pick-up 5. The CPU 16 serves as a controller for controlling all elements in the optical disc apparatus, and reads or writes data from/to the memory 17. The memory 17 can further comprise a ROM 17a and a RAM 17b. The CPU 16 and the memory 17 form a microcomputer.

Figure 2:
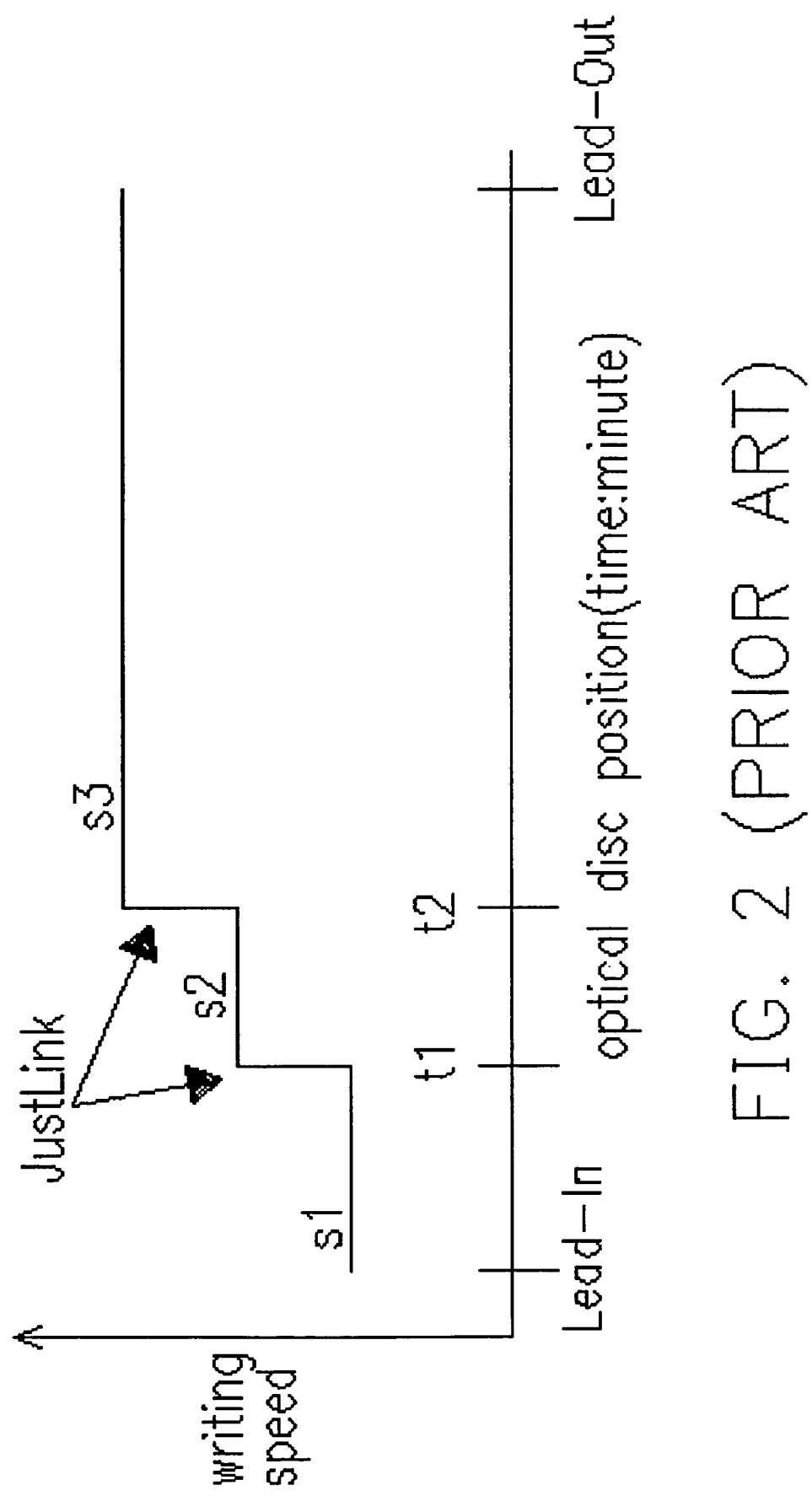
FIG. 2 shows an example for implementing the ZCLV writing.

FIG. 2 schematically shows a relationship between a writing position r and a rotational speed R of the spindle motor when the writing speed increases twice from the innermost circumference to the outermost circumference of the optical disc (the recording medium), wherein the ZCLV control is used for writing data. The rotational speed R of the spindle motor decreases slowly until a position where the writing speed raises because the writing speed must be a constant. Namely, the track length passing over the optical pick-up per unit time has to be controlled as a constant.

In the embodiment, the spiral track on the optical disc 1 is divided up to three zones to which the ZCLV writing or the CLV writing are performed. FIG. 3 shows an example for a zone dividing table having 5 modes. In the writing mode 1, the track on the optical disc 1 is not divided into zones, and the CPU 16 controls all elements in FIG. 1 to perform the CLV writing with an 8× writing speed entirely.

In mode 2, the track on the optical disc 1 is divided into two zones. The zone 1 is from the innermost circumference to a position t1 at 5 minutes and the zone 2 is from the position t1 at 5 minutes to the outermost circumference. The CPU 16 controls all elements to perform the CLV writing with an 8× writing speed at zone 1, and to perform the ZCLV writing with a 12× writing speed at zone 2. In mode 3, the track on the optical disc 1 is divided into three zones. Zone 1 is from the innermost circumference to a position t1 at 5 minutes, zone 2 is from the position t1 at 5 minutes to a position t2 at 30 minutes, and zone 3 is from the position t2 at 30 minute to the outermost circumference. The CPU 16 controls all elements to perform the CLV writing with an 8× writing speed at zone 1, with an 20× writing speed at zone 2, and to perform the ZCLV writing with a 24× writing speed at zone 3.

In mode 4, the track on the optical disc 1 is not divided into zones, and the CPU 16 controls all elements to perform the CLV writing with an 12× writing speed entirely. In mode 5, the track on the optical disc 1 is divided into two zones. Zone 1 is from the innermost circumference to a position t2 at 15 minutes and zone 2 is from the position t2 at 15 minutes to the outermost circumference. The CPU 16 controls all elements to perform the CLV writing with a 20× writing speed at zone 1, and to perform the ZCLV writing with a 24× writing speed at zone 2. The zone dividing table in FIG. 3 is stored in the memory 17. The CPU 16 can therefore read the zone dividing time (track dividing position) t1, t2 and the writing speed S1, S2, S3 for each mode from the zone dividing table stored in the memory 17.

Figure 5:
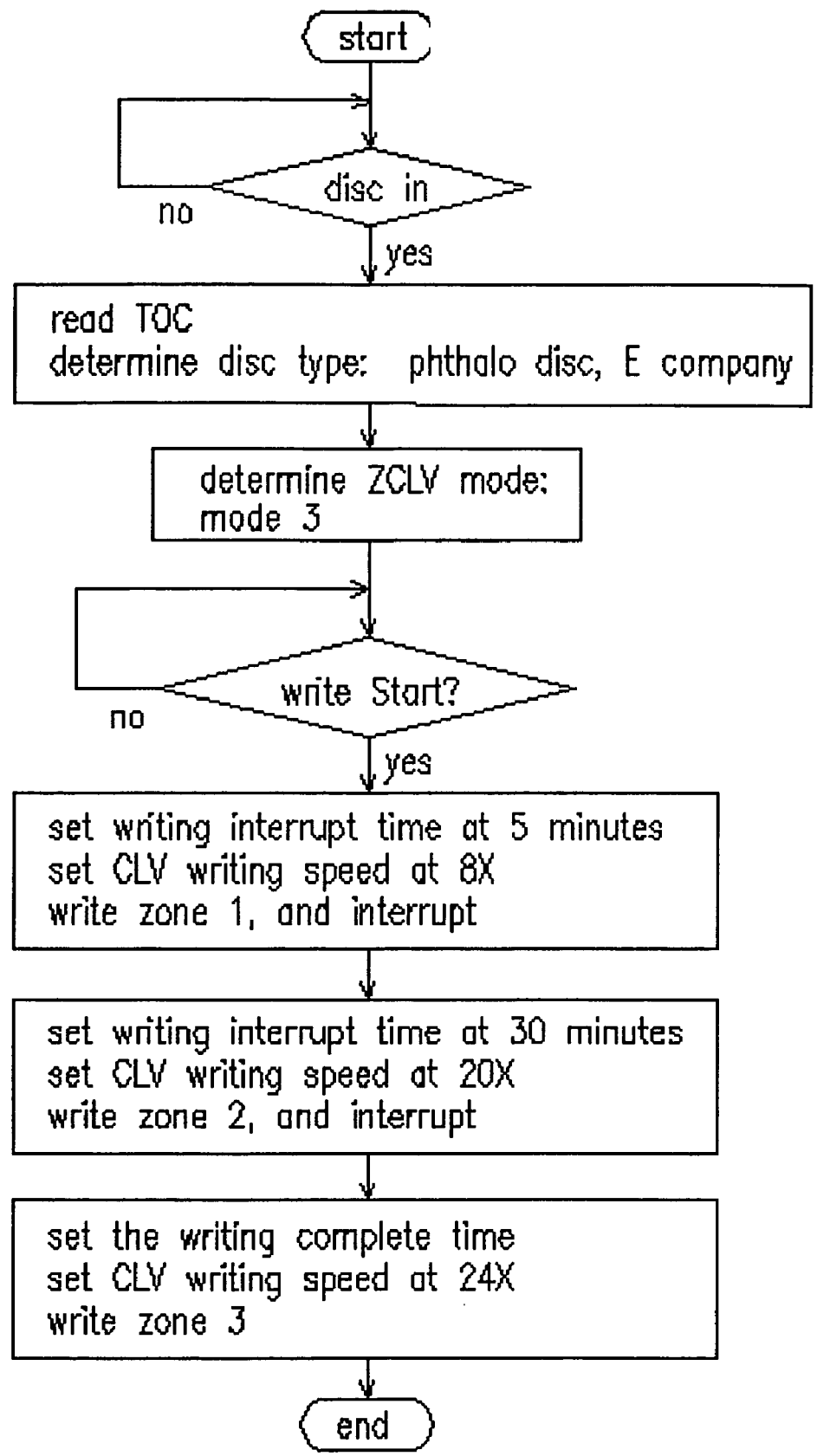
FIG. 5 is flow chart showing an operation according to the embodiment of the invention

FIG. 5 shows a flow chart showing an operation according to the embodiment of the invention. The CPU 16 controls each element in FIG. 1 to execute the operation flow in FIG. 5. As the optical disc 1 is loaded to the optical disc apparatus, a read TOC operation is performed. Reading the ATIP code in the lead-in area on the optical disc 1, information, showing such as the maker and the medium type etc, can be obtained, and the CPU 16 can determine the type of the optical disc 1 according to the ATIP code in the ATIP signal. Accordingly, the CPU 16 can serve as a disc type determining device. In the embodiment, the disc type is assumed to a phthalo type disc made by "E" company.

The memory 17 stores in advance a mapping map showing writing modes and corresponding suitable disc types, such as the cyanine type disc by "A" company, the phthalo-type disc by "A" company, the cyanine-type disc by "C" company, the phthalo-type disc by "D" company, the phthalo-type disc by "E" company, and the phthalo-type disc by "F" company. The CPU 16 can timely read the mapping table from the memory 17. According to the embodiment, at the design stage, various types of discs are written and evaluated for each writing mode and therefore find an optimum writing mode for each disc type in advance by experiment. According to the experimental result, the table in FIG. 4 is made and then stored in the memory 17.

As described above, a ZCLV mode of mode 3 is determined as a suitable mode for the type (phthalo-type disc by "E" company) of the optical disc 1 according to the table in FIG. 4. The track on the optical disc 1 is divided into three zones according to the zone dividing times (track dividing positions) and the writing speeds of the mode 3 in the zone dividing table stored in the memory 17, and the ZCLV writing is performed with a writing speed for each zone defined by the mode 3.

In the above situation, the CLV writing is performed to the zone 1 with an 8× writing speed until a position at 5 minutes is reached, and the recording is interrupted in such a manner that the data continuity is maintained by a method such as the disclosure in Japanese Laid Open H10-49990. Next, the CLV speed is set to 20× to restart the CLV recording in such a manner that the data continuity is maintained by a method such as the disclosure in Japanese Laid Open H10-49990 and perform the CLV recording unit a position at 30 minutes is reached, and then the recording is interrupted in such a manner that the data continuity is maintained by a method such as the disclosure in Japanese Laid Open H10-49990, by which the zone 2 CLV recording is performed. Finally, the CLV speed is set to 24× and the CLV writing is restarted in such a manner that the data continuity is maintained by a method such as the disclosure in Japanese Laid Open H10-49990 and perform the CLV recording unit a position at 30 minutes is reached, by which the zone 3 CLV recording is performed.

According to the embodiment, there are a plurality of writing modes. In the embodiment, it comprises the memory 17 used as a zone parameter storing device for storing the CLV speed for each zone and the dividing times for dividing zones (both as the zone parameters) for each mode, and the CPU used as the disc type determining device for determining the type of the optical disc 1. According to the result of the disc type determining device, the zone parameters suitable for the type of the optical disc 1 are selected from a plurality of zone parameters stored in the zone parameter storing device, and then the ZCLV writing is performed with a writing mode corresponding to the selected zone parameters. Because the writing speed is optimized, the ZCLV zone regions can be set according to the writing power characteristic and the mechanical characteristic for each disc type. Therefore, the track deviation will not occur and the writing can be performed with a higher speed.

Next, another embodiment of the invention is described in detail as follows. This embodiment performs a ZCLV writing, which is more elaborate than the previous embodiment. The CPU 16 controls each element in FIG. 1 to execute the following process. As the optical disc 1 is inserted to the optical disc apparatus, a Read TOC operation is performed to read the ATIP code in the lead-in area on the optical disc 1, so that information such as the maker and the disc type etc are read. The CPU 16 determines the type of the optical disc 1 according to the ATIP signal (ATIP code) from the ATIP decoder 12. In this embodiment, the type of the optical disc 1 is assumed to a phthalo-type disc by "A" company. Refer to FIG. 6, a table where the maximum writing speed for each type of the optical disc 1 is stored in the memory 17. The CPU 16 refers to the table in FIG. 6 to determine the maximum writing speed for each type of the optical disc 1.

As described above, because the phthalo-type disc by company "A" is determined as the type of the optical disc 1, the maximum writing speed is restricted to 12× by referring to the table stored in the memory 17 as shown in FIG. 6. According to the zone dividing table in FIG. 3, there are two possible ZCLV writing modes having a maximum writing speed: one is mode 2 and the other is mode 4. Next, a test writing is performed at a test area at the innermost circumference by the OPC operation to obtain an optimum writing power. This OPC operation is well known, and the writing power is increased sequentially and the writing is performed accordingly. The writing portion is read and the portion where the optimum writing is performed (the writing power) is assigned to the optimum writing power.

The writing speed for performing the OPC operation can be selected as follows. For example, a low and stable 8× writing speed for the CLV is selected to perform the OPC operation. The reason that the 8× writing speed is selected is because the track deviation will not occur and the OPC operation can be performed stably. According to the OPC result with the 8× CLV writing speed, an optimum writing power for the 8× CLV writing speed can be obtained. Accordingly, the optimum writing power for the 12× and 20× writing speeds can be deduced. For example, assuming the optimum writing power obtained from a linear velocity b is Pv, the optimum writing power $Pw(i)$ for the linear velocity $V(i)$ can be calculated as follows.

$$Pw(i)=a \cdot (V(i)-v) \times Pv+c$$

In the equation above, a and c stand for experimental values obtained by evaluating each type of the optical disc during the design of the optical disc apparatus. The types of the optical disc are stored in the memory 17. The CPU 16 calculates the optimum writing powers $Pw(i)$ for the 12× and 20× writing speeds according to the above equation. The optimum writing powers $Pw(i)$ for the 12× and 20× writing speeds are adjusted to not exceed the maximum laser power (the maximum output power of the laser source of the optical pick-up 5).

When the optimum writing powers $Pw(i)$ for the 12× and 20× writing speeds exceed the maximum laser power, the CPU 16 restricts the optimum writing powers $Pw(i)$ for the 12× and 20× writing speeds under the maximum laser power. When the optimum writing powers $Pw(i)$ for the 12× writing speed exceed the maximum laser power, the CPU 16 restricts the writing speed to the 8× writing speed, and selects the writing mode 2 by referring to the zone dividing table in FIG. 3. In addition, when the optimum writing powers $Pw(i)$ for the 12× writing speed does not exceed the maximum laser power, the CPU 16 selects the writing mode 4 having a faster writing speed by referring to the zone dividing table in FIG. 3.

The writing speed for performing the OPC operation can be selected as follows.

For example, the CLV writing with a maximum 12× writing speed can be also performed as follows. According to the result of the OPC operation, when the track deviation does not occur and the calculated optimum writing power for the 12× writing speed does not exceed the maximum laser power, the CPU 16 determines that the 12× CLV writing is possible, and then selects the writing mode 4 having a faster writing speed by referring to the zone dividing table in FIG. 3. According to the result of the OPC operation, when the track deviation occurs or the calculated optimum writing power for the 12× writing speed exceeds the maximum laser power, the OPC operation is performed again with the 8× CLV writing speed to obtain an optimum writing speed by the manner as describe above. According to the above result, the ZCLV writing of mode 2 is selected.

According to this embodiment, there are a plurality of writing modes. As in the previous embodiment, it comprises the memory 17 used as a zone parameter storing device for storing the CLV speed for each zone and the dividing times for dividing zones (both as the zone parameters) for each mode. The test writing is performed at the beginning of the writing. Based on the result of the test writing, one set of zone parameters is selected from a plurality of zone parameters stored in the zone parameter storing device, and then the ZCLV writing is performed with a writing mode corresponding to the selected zone parameters. Because the writing speed is optimized and the result of the test writing performed at the beginning of the writing is used to set the ZCLV zones, the zone parameters of the ZCLV can be set such that the unevenness of the optical disc apparatus and the optical disc can be contained. Therefore, a high-speed writing can be performed with a high reliability and without causing the track deviation.

Next, another embodiment of the invention is described in detail as follows. This embodiment performs a ZCLV writing, which is more elaborate than the previous embodiment. The CPU 16 controls each element in FIG. 1 to execute the following process. As the optical disc 1 is inserted to the optical disc apparatus, a Read TOC operation is performed to read the ATIP code in the lead-in area on the optical disc 1, so that information such as the maker and the disc type etc are read. The CPU 16 determines the type of the optical disc 1 according to the ATIP signal (ATIP code) from the ATIP decoder 12. In the previous embodiment, the type of the optical disc 1 is assumed to a phthalo-type disc by "A" company. Referring to FIG. 6, a table where the maximum writing speed for each type of the optical disc 1 is stored in the memory 17. The CPU 16 refers to the table in FIG. 6 to determine the maximum writing speed for each type of the optical disc 1.

As described above, because the phthalo-type disc by company "A" is determined as the type of the optical disc 1, the maximum writing speed is restricted to 12× by referring to the table stored in the memory 17 as shown in FIG. 6. According to the zone dividing table in FIG. 3, there are two possible ZCLV writing modes having a maximum writing speed: one is mode 2 and the other is mode 4. Next, a test writing is performed at a test area at the innermost circumference with an 8× CLV writing speed by the OPC operation to obtain an optimum writing power.

According to the OPC result with the 8× CLV writing speed, an optimum writing power for the 8× CLV writing speed can be obtained. Accordingly, the optimum writing power for the 12× and 20× writing speeds can be deduced. The CPU 16 calculates the optimum writing powers $Pw(i)$ for the 12× and 20× writing speeds. The optimum writing powers $Pw(i)$ for the 12× and 20× writing speeds are adjusted to not exceed the maximum laser power.

When the optimum writing powers $Pw(i)$ for the 12× and 20× writing speeds exceed the maximum laser power, the CPU 16 restricts the optimum writing powers $Pw(i)$ for the 12× and 20× writing speeds under the maximum laser power. When the optimum writing powers $Pw(i)$ for the 12× writing speed exceed the maximum laser power, the CPU 16 restricts the writing speed to the 8× writing speed, and selects writing mode 2 by referring to the zone dividing table in FIG. 3.

When the optimum writing powers $Pw(i)$ for the 12× writing speed exceed the maximum laser power, each area in the zone 1 on the optical disc 1 is accessed with a 12× CLV writing speed to examine whether any access error occurs or not. When the access error occurs, the CPU 16 determines that the servo follow for the 12× CLV writing is bad, and the minimum possible writing speed is reduced to an 8× CLV writing speed. Accordingly, the writing mode 2 is selected by referring to the zone dividing table in FIG. 3. In addition, when no access error occurs, the CPU 16 determines that the servo follow for the 12× CLV writing is good, and the writing mode 4 is selected by referring to the zone dividing table in FIG. 3.

In this embodiment, because the servo follow due to the access error is checked, the servo signals are actually monitored to determine whether the servo follow is bad or not. Namely, a device for detecting the deviation of the servo signal monitors the focusing error signal and the tracking error signal from the servo circuit 4 to determine that the servo follow is bad if the magnitudes of the servo signals are above a predetermined value. The device for detecting the deviation of the servo signal can be a servo signal monitoring unit included within the servo circuit 4. The CPU can timely monitor the output signal of the servo signal monitoring unit to examine whether any access error occurs or not.

According to this embodiment, there are a plurality of writing modes. As in the embodiment, it comprises the memory 17 used as a zone parameter storing device for storing the CLV speed for each zone and the dividing times for dividing zones (both as the zone parameters) for each mode. Before the writing, the optical disc 1 is accessed and based on the accessed result, one set of zone parameters is selected from a plurality of zone parameters stored in the zone parameter storing device, and then the ZCLV writing is performed with a writing mode corresponding to the selected zone parameters. Because the writing speed is optimized and the access test is performed before writing to examine the servo disturbance, a high-speed writing can be performed with a high reliability and without causing the track disturbance.

According to this embodiment, there are a plurality of writing modes. As in the embodiment, it comprises the memory 17 used as a zone parameter storing device for storing the CLV speed for each zone and the dividing times for dividing zones (both as the zone parameters) for each mode, and the device for detecting the deviation of the servo signal. According to the detected result, one set of zone parameters is selected from a plurality of zone parameters stored in the zone parameter storing device, and then the ZCLV writing is performed with a writing mode corresponding to the selected zone parameters. Because the writing speed is optimized and the access test is performed before writing to examine the servo disturbance, a high-speed writing can be performed with a high reliability and without causing the track disturbance.

Figure 7:
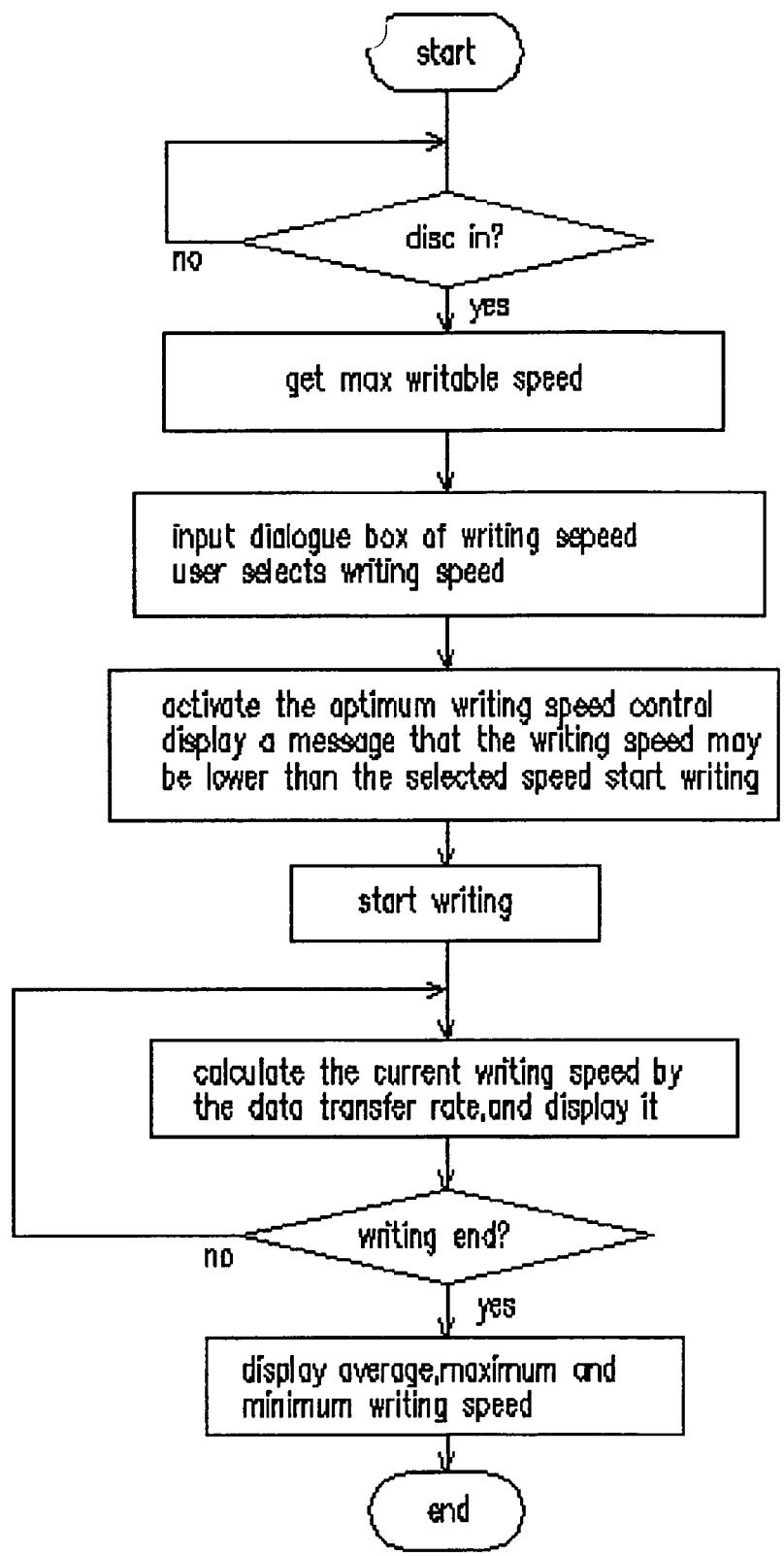
FIG. 7 is flow chart showing an operation according to another embodiment of the invention.

Next, another embodiment of the invention is described in detail as follows. This embodiment is an example of an information processing apparatus composed of the optical disc apparatus in the previous embodiment and a personal computer. The personal computer severs as a host for writing data to the optical disc 1 by a write software. In the embodiment, the information processing apparatus composed of the optical disc apparatus in the previous embodiment and the host above performs the following ZCLV writing. FIG. 7 is a flow chart showing an operation according to the eighth embodiment of the invention. The CPU 16 controls all elements in FIG. 1 to execute the operation in FIG. 7.

As the optical disc 1 is inserted to the optical disc apparatus, a Read TOC operation is performed to read the ATIP code in the lead-in area on the optical disc 1, so that information such as the maker and the disc type etc are read. The CPU 16 determines the type of the optical disc 1 according to the ATIP signal (ATIP code) from the ATIP decoder 12. In the previous embodiment, the type of the optical disc 1 is assumed to a phthalo-type disc by "E" company.

The CPU 16 refers to the table stored in the memory 17, in which the maximum writing speed for each type of the optical disc 1 is stored, to determine a maximum writing speed corresponding to the above selected type of the optical disc 1 (the phthalo-type disc by "E" company), and then this maximum writing speed is returned to the host (or the write software). The host can use the write software to inquire the user about the writing speed of the optical disc 1 via a dialogue box, for example. At this time, the host can display a message by the write software that a writing speed larger than the maximum writing speed informed by the CPU 16 cannot be set (cannot be selected). Alternatively, if all writing speeds are displayed and when a writing speed larger than the maximum writing speed informed by the CPU 16 is selected, the host will display a message that the writing speed is restricted to the maximum writing speed informed by the CPU 16. Therefore, the writing speed selected by the user is changed to the maximum writing speed informed by the CPU.

Next, just before the writing is started, the host uses the write software to activate the speed control for the optimum writing speed and then informs the user with a message that the actual writing speed may be lower than the writing speed selected by the user. The host sets the writing speed selected by the user as the writing speed of the data writing. Data is then transmitted to the host interface 11 (referring to FIG. 1) of the optical disc apparatus with a data transfer rate corresponding to the writing speed that is set above. The data transfer rate during the data writing is measured. According to the measured result, the writing speed during the data writing or an average writing speed is calculated constantly and displayed to the user. When the data writing is finished, the host uses the write software to calculate an average value, a maximum value and a minimum value of the writing speed, and then the host displays the calculated result as a report to the user, which can be a reference for selecting the writing speed next time.

In addition, the optical disc apparatus possesses a function to turn on or turn off the optimum writing speed control mentioned above. The function can turn on or turn off the optimum writing speed control according to commands (vendor unique commands, such as the mode select) transmitted by the write software from the host. The host can set the optimum writing speed control to ON/OFF from a setting menu of the write software. When the optimum writing speed control is turned on, the CPU 16 performs the operation mentioned above, and when the optimum writing speed control is turned off, the CPU 16 performs a ZCLV writing with a predetermined writing speed that is irrelevant to the type of the optical disc 1.

According to this embodiment, the optical disc apparatus has a function for informing the host or the write software of the optimized writing speed (the maximum writing speed). The host or the write software uses the informed optimum writing speed to display a user message that to set the writing speed higher than the informed optimum writing speed is impossible, or to display that the writing speed is changed to the informed optimum writing speed and the data writing will be performed with the optimum writing speed limitation when the writing speed higher than informed optimum writing speed is selected. Therefore, the user can be noticed that the writing speed selected by the user is different from the actual writing speed.

In addition, according to this embodiment, the host or the write software has a function to measure the data transmitting rate during the data writing. Because the writing speed and the average writing speed during the data writing, or the average writing speed, the maximum writing speed and the minimum writing speed after the data writing is finished, can be reported to the user, the user can know the actual writing speed and the time when the data writing is finished.

In addition, the present embodiment has a function to activate or deactivate the optimizing control of the writing speed. Because the host or the write software can optionally activate or deactivate the optimizing control of the writing speed, the user can know the actual writing speed and the time when the data writing is finished.

Figure 8:
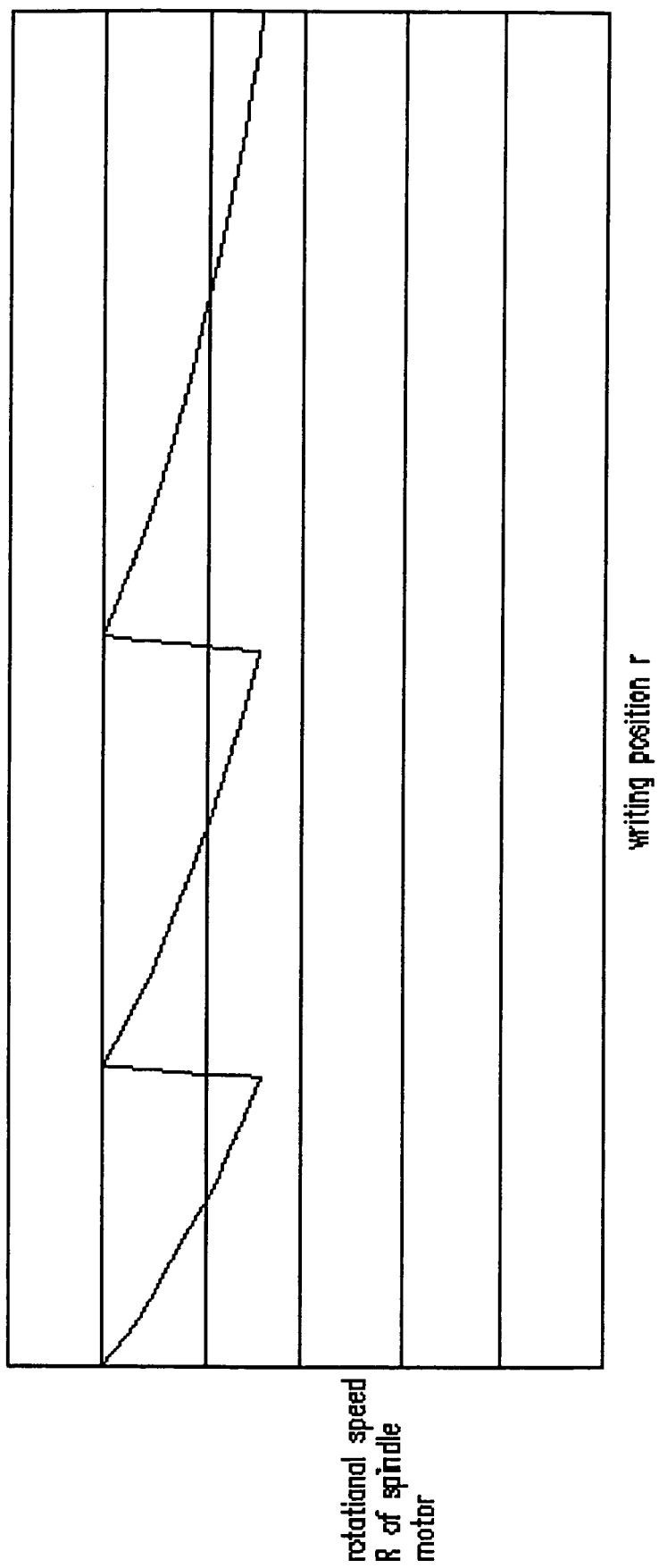
FIG. 8 schematically shows a relationship between a writing position r and a rotational speed R of the spindle motor when the writing speed increases twice from the innermost circumference to the outermost circumference of the optical disc (the recording medium), wherein the ZCLV control is used for writing data.

FIG. 8 schematically shows a relationship between a writing position r and a rotational speed R of the spindle motor when the writing speed increases twice from the innermost circumference to the outermost circumference of the optical disc (the recording medium), wherein the ZCLV control is used for writing data. The rotational speed R of the spindle motor is slowly decreased until a writing position where the writing speed increases. This is to keep the writing speed to be constant, i.e., to control the track length passing over the optical pick-up per unit time to be constant. At the writing position where the writing speed rises, the rotational speed of the spindle motor under the writing speed rising at the above writing position can be determined as the same as a rotational speed of the spindle motor when data is written to the innermost circumference of the optical disc. Therefore, when the writing speed at the inner circumference of the recording medium rises, the spindle motor has to rotate at a high speed and a particular design for such a high-speed rotational speed is required. Additionally as the writing position where the writing speed rises moves to the outer circumference of the optical disc, the spindle motor rotates at a speed slower than the writing speed when data is recorded on the innermost circumference of the optical disc, and therefore merits of high-speed recording is reduced.

Assuming that the rotational speed of the spindle motor 2 is R (rpm) and the distance of the writing position from the center of the optical disc 1 is r (mm), the linear velocity at the writing position can be expressed as the following equation in which $\pi$ is the circumference ratio.

$$V = 2 \times \pi \times (r/1000) \times (R/60)$$

For the CLV control, the linear velocity V is a constant. As the writing position is moved to the outer circumference of the optical disc 1, the distance r gets larger and the rotational speed R becomes smaller. The writing speed is a constant because the writing speed only depends on the linear velocity.

Assuming the maximum of the rotational speed R is Rmax and the the writing position at the innerest circumference is r1, the linear velocity V1 is expressed below.

$$V1 = 2 \times \pi \times (r1/1000) \times (Rmax/60)$$

At the outer circumference of the optical disc 1, because the rotational speed R of the spindle motor 2 becomes slow, the margin for the spindle motor 2 is still enough. If the writing speed is accelerated to a high speed from certain position r2 of the optical disc 1, the corresponding linear velocity v2 can be expressed as the equation below.

$$V2 = 2 \times \pi \times (r2/1000) \times (Rmax/60)$$

Accordingly, because r1<r2, v1<v2.

In order to control the linear velocity v2 to be a constant, because the rotational speed R of the spindle motor 2 becomes small when data is recorded on an outer circumference out of the position r2, the writing process can be performed at the writing speed V2 when data is recorded on the outer circumference out of the position r2 until the rotational speed R of the spindle motor 2 reaches its maximum Rmax. Similarly, if the writing speed is accelerated to a high speed from certain position r3 at the outer circumference of the optical disc 1, the corresponding linear velocity V3 can be expressed as the equation below.

$$V3 = 2 \times \pi \times (r3/1000) \times (Rmax/60)$$

Accordingly, because r2<r3, V2<V3. The writing speed can be increased.

The writing is interrupted at the position where the writing speed raises. When data is recorded by a format (such as an ISO9660 format) capable of randomly cutting the track at a mastering time point, by mastering such that the track is ended at the predetermined position, the position can be used as a joint of the tracks, and therefore the writing can be interrupted. Additionally, if a technology, such as the JustLink in practical use, is used, once the writing is interrupted at a random position on the optical disc 1, it is possible to vary the writing speed to restart the writing process. When writing a packet, because the size of the packet is very small in comparison with the total writing capacity of the optical disc, the writing of the packet is ended almost at the position where the writing speed raises, and therefore the writing process can be interrupted.

However, according to the invention, to increase the writing speed is not only to match the Rmax. When it determines that problems do not occur in the writing quality if the writing speed is increased prior to the predetermined speed raising position, the writing speed can be then increased prior to the predetermined speed raising position. In contrast, when it determines that problems occur in the writing quality if the writing speed is increased at the predetermined speed raising position, the writing speed is then increased behind the predetermined speed raising position. In addition, when it determines that problems occur in the writing quality if the current writing speed is maintained to write, then the writing speed is lowered.

Figure 9:
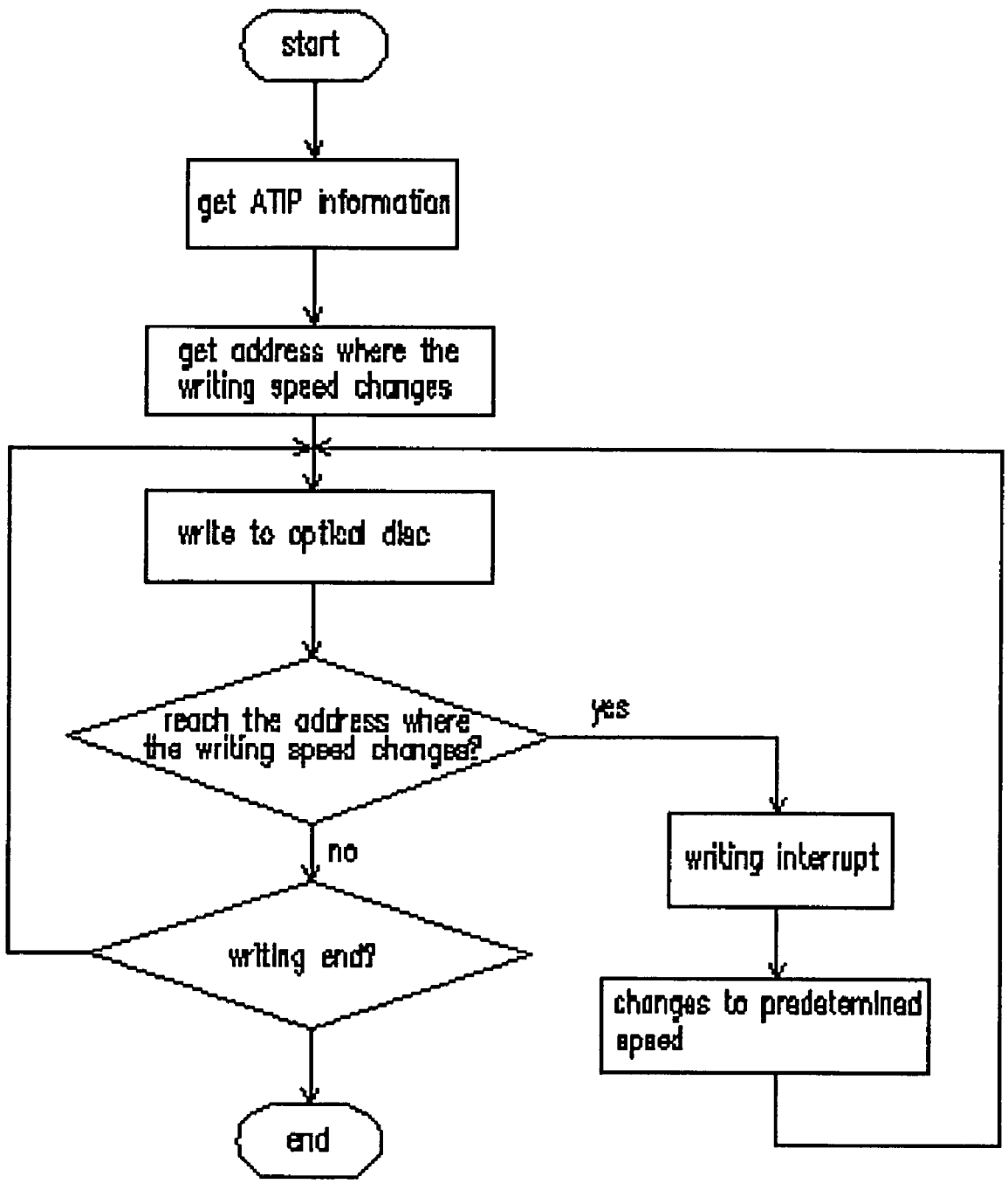
FIG. 9 is a flow chart showing an operation of the optical disc apparatus according to another embodiment of the invention.

FIG. 9 is a flow chart showing an operation of the optical disc apparatus according to the present embodiment of the invention. In the embodiment, the ATIP signal (the ATIP information) is used as a criterion for determining a position of the optical disc where the rotational speed is increased or reduced. The ATIP information is an address information recorded on a blank optical disc in advance, but also contains information with a certain ratio about the maker of the optical disc. Namely, the characteristic of the optical disc can be understood by reading the ATIP information. During the stage of design of the optical disc apparatus, the optimum position where the rotational speed is increased or reduced is determined by evaluating in advance the ATIP information of the optical disc, and the writing speed can be controlled to meet both the stable writing and the high-speed recording.

As show in FIG. 3 and referring to FIG. 1, the CPU 16 gets the ATIP information from the ATIP decoder 12. According to the ATIP information, the optimum speed increasing position and the speed reducing position are evaluated. After the predetermined speed raising position and speed lowering position (speed change position) is corrected to a speed change position where the speed is increased and there is no problem in the writing quality, the elements in FIG. 1 are then controlled to start writing to an initial zone on the optical disc 1, as described above.

When the writing position (writing address) on the optical disc 1 does not reach the speed change address above, the CPU 16 lets the writing process continue. The writing process is interrupted each time when the writing position (writing address) on the optical disc 1 reaches the speed change address above. The rotational speed of the spindle motor 2 is changed to the predetermined speed by the motor driver 3 such that the writing to the next zone is started.

As described above, according to this embodiment, because the CPU 16 is used as a device for changing the position where the writing speed to the optical disc 1 is changed according to the characteristic of the optical disc for writing data, both the stable writing and the high-speed writing can be obtained by the characteristic of the optical disc.

In addition, according to the present embodiment, because the CPU 16 determines the position where makes the writing speed to the optical disc 1 change from the ATIP information recorded in advance on the optical disc 1, the position where makes the writing speed change can be changed, by which both the stable writing and the high-speed writing can be obtained according to the characteristic of the optical disc.

Figure 10:
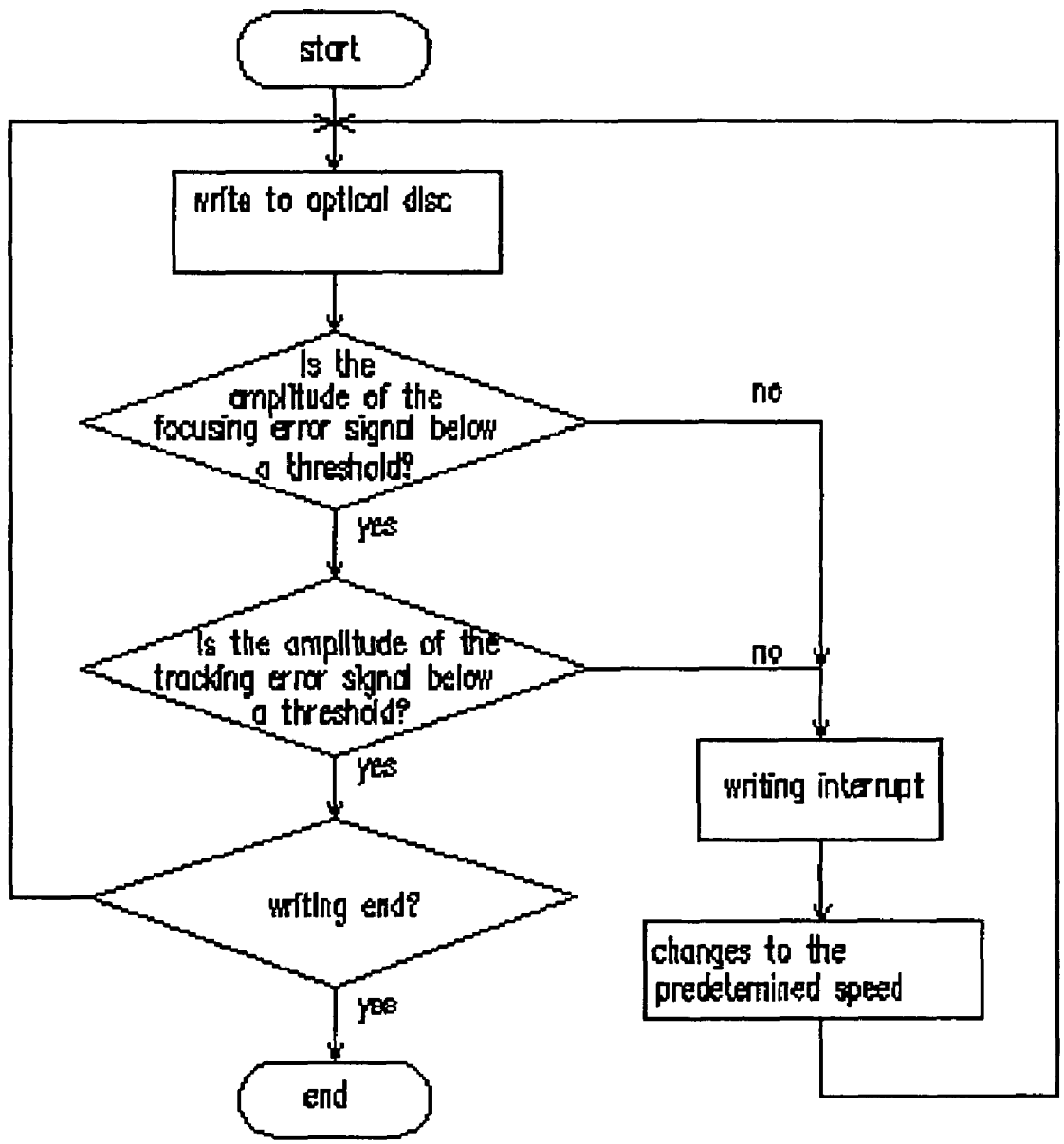
FIG. 10 is flow chart showing an operation according to another embodiment of the invention.

FIG. 10 is flow chart showing an operation according to the present embodiment of the invention. The operation flow performed in FIG. 4 replaces the operation flow in FIG. 9. Namely, first, when recording, the CPU 16 controls each element of the optical disc apparatus and performs the writing process to the optical disc 1, by which the servo status is monitored to determine the characteristic of the optical disc 1.

Referring to FIG. 10 as well as FIG. 1, the CPU 16 uses a focusing error signal and a tracking error signal from the servo circuit 4 for showing the servo status. The CPU 16 monitors the status of the focusing error signal and the tracking error signal. If any one of the amplitudes of the focusing error signal and the tracking error signal is below a threshold value, the CPU 16 determines that the servo status is good and keeps the writing process to be executed continuously. If any one of the amplitudes of the focusing error signal and the tracking error signal is above the threshold value, the CPU 16 determines that the servo status is bad and interrupts the writing process. The rotational speed of the spindle motor 2 is then changed by the motor driver 3 to the predetermined speed (to lower the rotational speed). Therefore, the servo stability can be maintained to start the writing to the next zone.

According to the present embodiment, the position on the optical disc 1 where the writing speed is made to change is determined by monitoring the servo status of the optical disc 1. By monitoring the servo status to obtain the characteristic of the optical disc 1, the CPU 16 can change the position where the writing speed is made to change such that both the stable writing and the high-speed writing can be satisfied.

Figure 11:
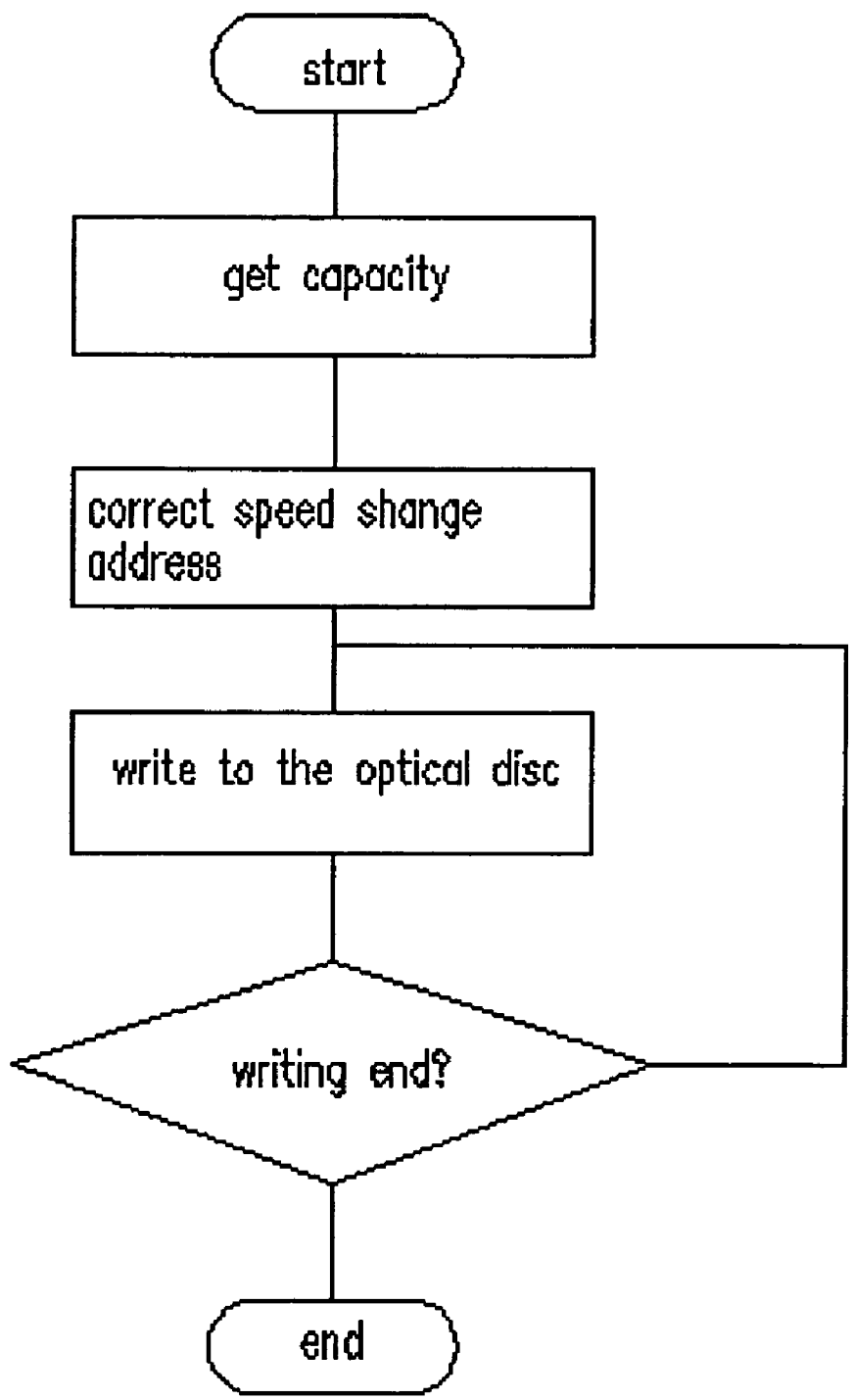
FIG. 11 is flow chart showing an operation according to another embodiment of the invention.

FIG. 11 is flow chart showing an operation according to the present embodiment of the invention. In this embodiment, the operation flow performed in FIG. 11 replaces the operation flow in FIG. 9. The CPU 16 determines the characteristic of the optical disc 1 by a capacity of the optical disc 1. For example, a CD-R disc usually has a writing area (capacity) of 74 minutes. However, recently, because the track of the disc is arranged with a track pitch near a minimum value defined by the specification, there exists a CD-R disc with a writing area (capacity) of 80 minutes or above. As compared with a conventional CD-R having a writing area of 74 minutes, even though at the same address, this address on the CD-R with a writing area (capacity) of 80 minutes or above is located at the inner circumference. Namely, the spindle motor has to rotate the CD-R with a writing area (capacity) of 80 minutes or above with a higher speed, and therefore the stable writing is impossible. Accordingly, by changing the speed raising position or the speed lowering position according to the disc capacity, the assumed rotational speed of the spindle motor can be maintained.

As shown in FIG. 11, when writing, the CPU 16 gets the writing capacity of the optical disc 1 according to the reproducing signal from the read amplifier 6. Based on the capacity, the position where the optimum writing speed is raised or lowered is evaluated. After the predetermined speed raising position and speed lowering position (speed change position) is corrected to a speed change position where the speed is increased with no problem in the writing quality, the elements in FIG. 1 are then controlled to perform the writing to the zones on the optical disc. The CPU 16 sets the speed change address to the above corrected speed change address.

According to the embodiment, the position on the optical disc 1 where the writing speed is made to change is determined by the capacity of the optical disc 1. By the capacity of the optical disc 1 to obtain the characteristic of the optical disc 1, the CPU 16 can change the position where the writing speed is made to change such that both the stable writing and the high-speed writing can be satisfied.

Next, another embodiment according to the invention is described in detail as follows. In the present embodiment, several differences from the previous embodiment are described as follows. In this embodiment, instead of the zone parameters that are stored in advance in the memory device in the writing method mentioned above, optimum zone parameters for the optical disc are generated to record data on the optical disc.

For the ZCLV writing technology, the writing continuity at any position can be ensured, and as the data writing is interrupted, the writing can be restarted. A method is provided to perform the ZCLV writing by raising the CLV velocity when the writing is restarted. However, the method for determining the zone for optimizing the writing for various types of optical discs and the method for determining the writing speed for each zone, for example, are not proposed. In the embodiment, by the methods mentioned above and randomly changing positions where the CLV velocity raises, the writing can be performed to meet both the stable writing and the high-speed recording.

For an optical disc with an eccentricity and a burred surface, the eccentric component causes a vibration in the radial direction and the tracking is affected, while the burred surface causes a vibration in the axial direction and the focusing is affected. Therefore, it requires a higher response to follow the vibrations. To follow becomes impossible because of the large eccentricity and the large burred surface.

When the optical disc is rotated at a high speed, the vibration due to the eccentricity or the burred surface of the optical disc also vibrates fast with a speed proportional to the rotational speed. As a result, the focusing servo system and the tracking servo system have to respond with a high speed, too. Assuming the focusing servo system and the tracking servo system have no failures, if the optical disc is rotated fast with a number of rotations above a certain value, the writing cannot be performed. However, in order to record with a high speed, it requires the optical disc to rotate fast.

As described above, there is unevenness in the optical disc apparatus or on the optical disc. Because various types of optical discs are loaded into the optical disc apparatus, the upper limit of the rotational speed of the optical disc becomes different. In the embodiment, even though there are different upper limits of the rotational speed, the settings of the zone switching time and the CLV velocity for each zone can be altered in real time.

If the focusing and the tracking cannot be followed, the writing cannot be performed accordingly. In the situation, it is necessary to decrease the writing speed to record with status having a servo margin. However, this is contrary to the requirement of the high speed recording. To solve this issue, the servo status of the optical disc to be recorded is monitored.

When the servo status is good, the position where the speed for the ZCLV control is switched is forward (change the position to the inner circumference) such that the writing is performed at a higher speed. On the contrary, when the servo status is bad, the position where the speed for the ZCLV control is switched is backward (change the position to the outer circumference) such that the servo status will not fail.

A technology, known as the running OPC (ROPC, running optimum power calibration), is used for writing data on the optical disc. When the ROPC is not performed, the writing power for the optical disc is constant, which is the writing power obtained by the OPC at the beginning of the recording. When the ROPC is performed, the writing power is varied in response to the variation of the writing sensitivity of the optical disc such that the writing can be always made with an optimum writing power. For an optical disc with a large variation of the writing sensitivity, the writing power becomes large when the ROPC is performed as well as the writing is performed. Therefore, the writing power reaches the limit of the emitting power of the laser source of the optical pick-up. In this situation, if the writing is performed with current writing speed without change, there exists a difference between the writing power required for writing data on the optical disc and the actual writing power. Therefore, the writing quality to the optical disc is degraded. However, according to the eighth embodiment, the CPU 16 controls each element to perform the OPC. When the writing power reaches the limit of the emitting power of the laser source, the writing speed is reduced to continue the recording. Therefore, the writing can be performed and a good writing quality can be maintained.

Figure 12:
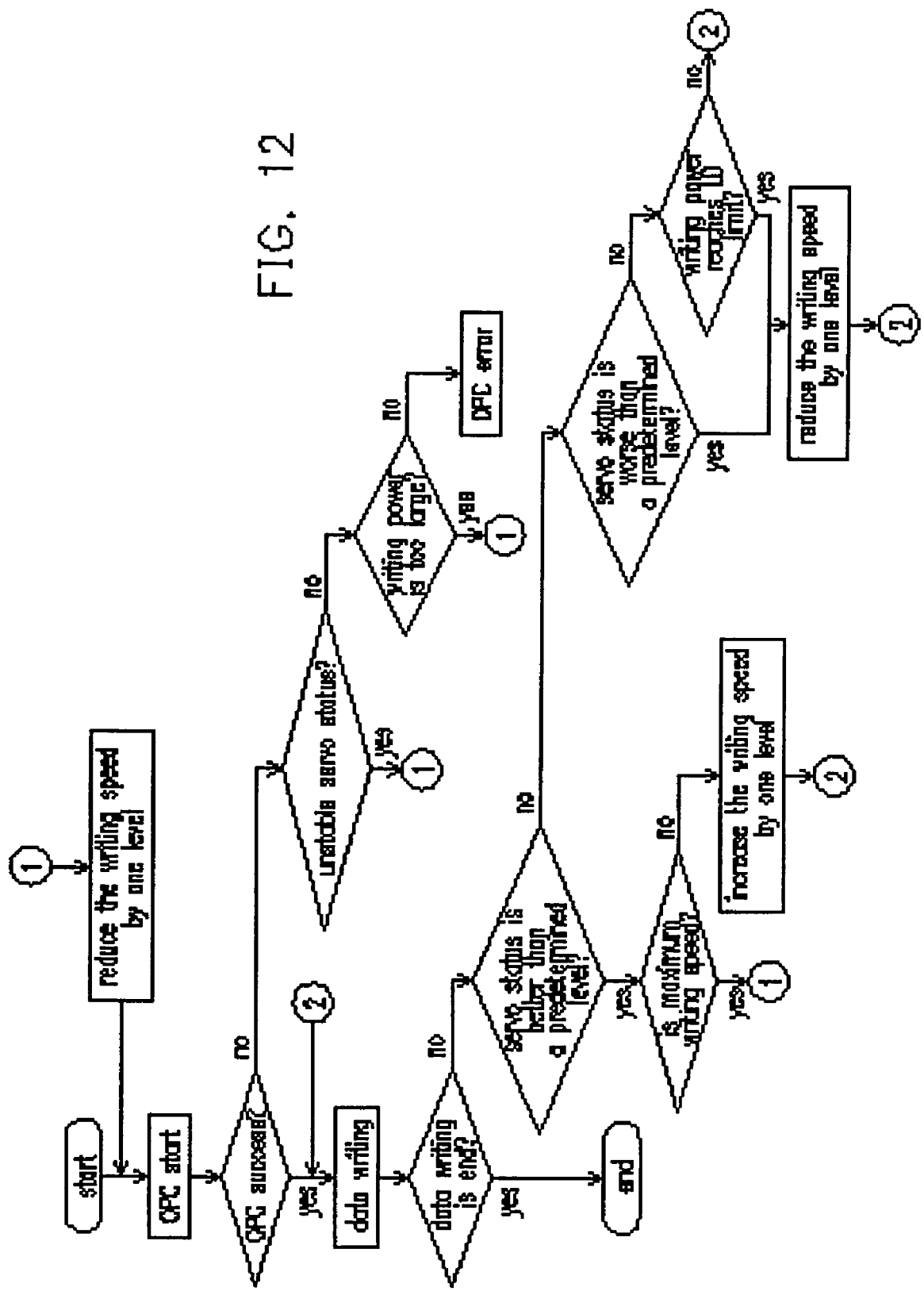
FIG. 12 is flow chart showing an operation according to another embodiment of the invention.

FIG. 12 is flow chart showing an operation according to the embodiment of the invention. Referring to FIG. 12 and FIG. 1, when writing data on the optical disc 1, the CPU 16 performs the OPC above to the optical disc 1 before recording. If the OPC is failed, the CPU determines whether the focusing servo status and the tracking servo status are bad according to the focusing error signal and the tracking error signal from the servo circuit 4, and determines whether the writing power is too large by determining the emitting power of the laser source of the optical pick-up 5 according to the output signal from the read amplifier 6.

In the case that the OPC fails, if any one of the focusing servo status and the tracking servo status is good and the emitting power of the laser source is not too large, the CPU determines an OPC error. In addition, when any one of or both of the focusing servo status and the tracking servo status are bad, or if the emitting power of the laser source is too large, the CPU 16 solves this problem by reducing the writing speed, and therefore the rotational speed of the spindle motor 2 is reduced one level by the motor driver 3 such that the writing speed is reduced one level and the OPC is restarted.

If the OPC is a success, the CPU 16 then records data on the optical disc 1 as described above. At this time, the CPU 16 monitors constantly the focusing servo status and the tracking servo status by monitoring the focusing error signal and the tracking error signal from the servo circuit 4, and monitors the emitting power of the laser source by monitoring the output signal of the read amplifier 6. Any one of or both of the focusing servo status and the tracking servo status are better than the predetermined levels, the CPU 16 then determines whether the writing speed can be further raised or not. When any one of or both of the focusing servo status and the tracking servo status are better than the predetermined levels and the writing speed is the maximum writing speed, the current time point is then used as a zone dividing time. Based on the dividing time, zone parameters (the dividing time for dividing the zone and the CLV velocity for each zone) are generated to move to a next zone in the ZCLV manner from that time point. According to the zone parameters, the rotational speed of the spindle motor 2 is raised one level by the motor driver 3 such that the writing speed is raised one level accordingly to continue the ZCLV writing with a writing mode corresponding to the zone parameters. Therefore, the writing speed is optimized.

The predetermined levels mentioned above mean that even though the writing speed is raised one level, status where no failure in the focusing servo and the tracking servo can be determined, and the levels can be measured by the amplitudes of the focusing error signal and the tracking error signal. The focusing servo status and the tracking servo status when the writing speed is raised one level can be deduced from the focusing servo status and the tracking servo status at the current rotational speed of the optical disc. This can be made during the design stage of the optical disc apparatus. During the design, the relationship among the amplitudes and the predetermined levels of the focusing error signal and the tracking error signal can be found, and then the predetermined levels can be stored in the memory. Therefore, to determine whether the focusing servo status and the tracking servo status are better than the predetermined levels becomes possible.

In addition, the CPU 16 determines whether any one or both of the focusing servo status and the tracking servo status are worse than the predetermined levels. When any one or both of the focusing servo status and the tracking servo status are worse than the predetermined levels and the writing continuously proceeds without any change, because of the focusing servo deviation, the tracking servo is drifted and the writing quality degradation can be predicted, and therefore the current time point is then used as a zone dividing time. Based on the dividing time, zone parameters are generated to move to a next zone in the ZCLV manner from that time point. According to the zone parameters, the rotational speed of the spindle motor 2 is lowered one level by the motor driver 3 such that the writing speed is lowered one level accordingly to continue the ZCLV writing with a writing mode corresponding to the zone parameters. Therefore, the writing speed is optimized.

In addition, the CPU 16 determines whether the emitting power of the laser reaches a limit (a lower limit) according to the output signal from the read amplifier 6. When the emitting power of the laser reaches the lower limit, because the insufficient writing power and the degraded writing quality can be predicted, therefore the current time point is then used as a zone dividing time. Based on the dividing time, zone parameters are generated to move to a next zone in the ZCLV manner from that time point. According to the zone parameters, the rotational speed of the spindle motor 2 is lowered one level by the motor driver 3 such that the writing speed is lowered one level accordingly to continue the ZCLV writing with a writing mode corresponding to the zone parameters. Therefore, the writing speed is optimized.

Figure 13:
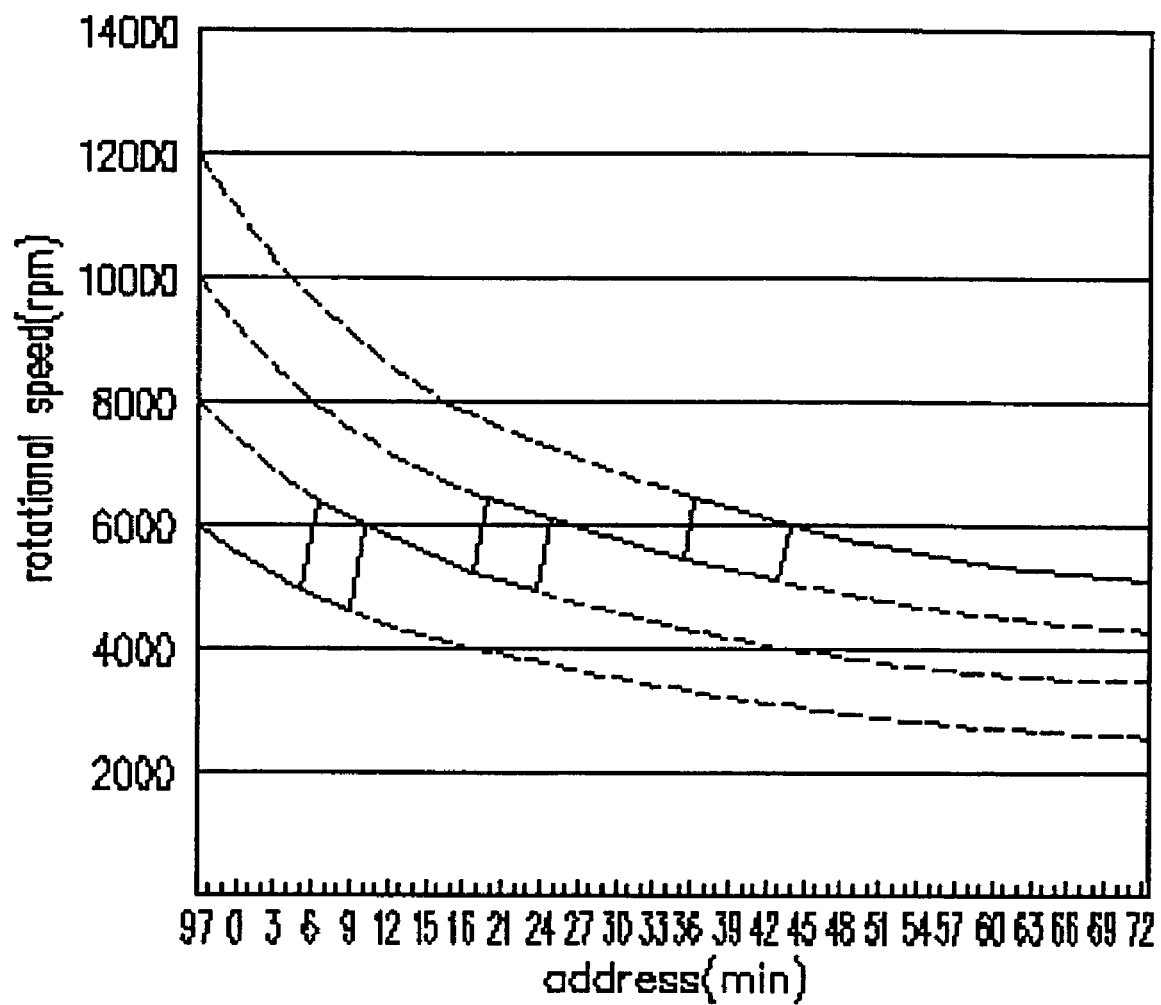
FIG. 13 is a graph showing the rotational speed of the optical disc when the optical disc apparatus records data on the optical disc according to another embodiment.

FIG. 13 is a graph showing the rotational speed of the optical disc when the optical disc apparatus records data on the optical disc according to the embodiment. In FIG. 13, the dashed lines show the rotational speeds of the optical disc when the optical disc is rotated under a variety of writing speeds at addresses on the optical disc. In addition, the thick lines show a variation of the rotational speed of the optical disc when the servo limit is assumed only dependent on the optical disc and the rotational speed is 6500 rpm. The thin lines show a variation of the rotational speed of the optical disc when data is recorded on the optical disc in the ZCLV manner with a 12× writing speed at the beginning, a 16× writing speed at 10 minutes, a 20× writing speed at 25 minutes, a 24× writing speed at 45 minutes.

Regarding the writing methods in previous embodiments, the zone switching time can be only selected from several choices. However, in the embodiment, the zone switching time is determined by the servo status and the emitting power of the laser source. As shown in FIG. 13, for example, if the upper limit of the rotational speed of the optical disc is 6500 rpm and the optical disc is in a good servo status, a high-speed writing can be performed only without exceeding the upper limit of the rotational speed, and therefore the writing time can be reduced.

In the embodiment, the focusing error signal is used in order to catch the servo status. When the focus of the laser beam is beyond the writing surface of the optical disc with a deviation, a difference voltage from a reference voltage, which is proportional to the deviation, is generated as the focusing error signal, wherein the reference voltage is defined according to that the focus of the laser beam from the laser source for recording/reproducing falls on the recording surface of the optical disc. Namely, when the amplitude of the focusing error signal is large, the status of the focusing servo follow becomes worse. As the rotational speed of the optical disc is increased, the vibration due to the burred surface of the optical disc becomes large and fast. Therefore the focusing servo follow also becomes worse and the amplitude of the focusing error signal becomes large. The amplitude of the focusing error signal for the vibration limitation where the focusing servo follow is still possible is measured according to various optical disc apparatus. The optical disc is made to rotate with a high speed without exceeding the limit of the amplitude of the focusing error signal, such that the writing will not fail and the high-speed writing is possible.

Additionally, in the embodiment, the tracking error signal is used in order to catch the servo status. When the laser beam is beyond the center of the track with a deviation, a difference voltage from a reference voltage, which is proportional to the deviation, is generated as the tracking error signal, wherein the reference voltage is defined according to when the laser beam from the laser source for recording/reproducing follows the center of the track recorded on the optical disc in advance. Namely, when the amplitude of the tracking error signal is large, the status of the tracking servo follow becomes worse. As the rotational speed of the optical disc is increased, the vibration due to the burred surface of the optical disc becomes large and fast. Therefore the tracking servo follow also becomes worse and the amplitude of the tracking error signal becomes large. The amplitude of the tracking error signal for the vibration limitation where the tracking servo follow is still possible is measured according to various optical disc apparatus. The optical disc is made to rotate with a high speed without exceeding the limit of the amplitude of the tracking error signal, such that the writing will not fail and the high-speed writing is possible.

In the embodiment, the variation of the writing power from the ROPC is used to prevent the writing quality from degradation in advance. The writing power to the optical disc is increased or decreased by the ROPC to optimize the writing sensitivity of portions where it is recorded on the optical disc. In general, a large writing power is required when the writing to the optical disc is moved to the outer writing position. As the writing power becomes large, the writing power also reaches the limit that the laser source of the optical disc apparatus can emit. If the large writing power is still used for recording, the insufficient writing power is obvious. The optical disc is made to rotate with a high speed without exceeding the limit of the writing power, such that the writing quality is not damaged and the high-speed writing is possible.

In this embodiment, the focusing error signal and the tracking error signal are used in order to catch the servo status. Because the focusing error signal shows the servo deviation due to the movement in the axial direction of the optical disc, and the tracking error signal shows the servo deviation due to the movement in the radial direction of the optical disc, the servo deviation can be more accurately detected previously by using both the focusing error signal and the tracking error signal as criteria for determining the servo disturbance. The optical disc is made to rotate with a high speed without exceeding the limit of the amplitudes of the tracking error signal and the focusing error signal, such that the writing quality is not damaged and the high-speed writing is possible.

Furthermore in the embodiment, the focusing error signal and the tracking error signal are used in order to catch the servo status. Because the focusing error signal shows the servo deviation due to the movement in the axial direction of the optical disc, and the tracking error signal shows the servo deviation due to the movement in the radial direction of the optical disc, the servo deviation can be more accurately detected previously by using both the focusing error signal and the tracking error signal as criteria for determining the servo disturbance. The variation of the writing power from the ROPC result is also monitored, and the writing speed is lowered when the writing power reaches the limit of the emitting power. The optical disc is then made to rotate with a high speed without exceeding the limit of the amplitudes of the tracking error signal and the focusing error signal, such that the writing quality is not damaged and the high-speed writing is possible.

Figure 14:
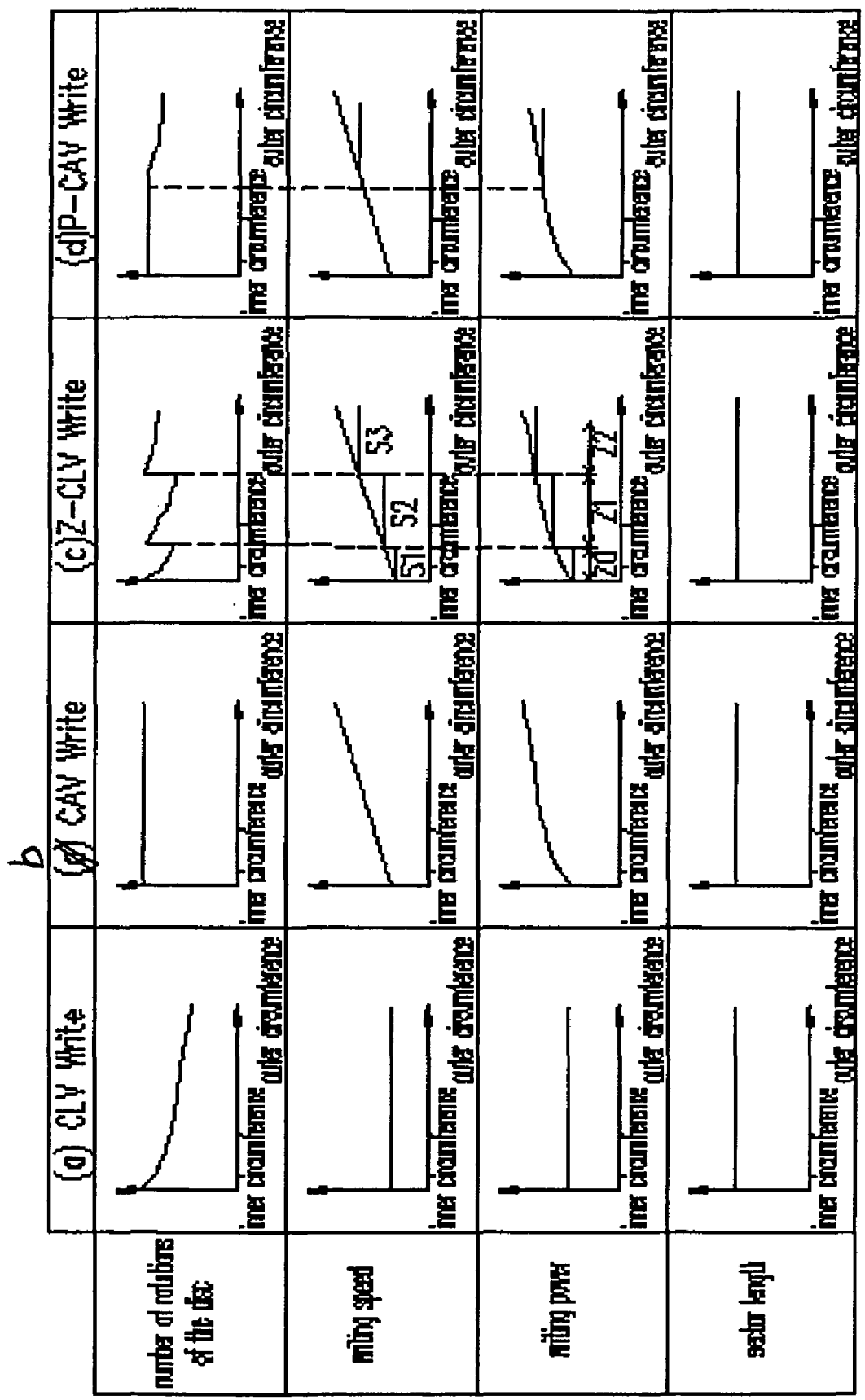
FIG. 14 is a diagram for explaining and comparing various methods of data recordings for a CD

FIG. 14 is a diagram for explaining and comparing various methods of data recordings for a CD. In column (a) to (d) of FIG. 14, the variations of the number of rotations of the optical disc, the writing speed, the writing power and the sector length are shown from the inner circumference to the outer circumference. For CD, because the writing format is the CLV manner, the sector lengths of the recorded optical disc are the same no matter what writing method is used. In FIG. 14, (a) is the general CLV method, (b) is the general CAV method, and (d) is the PCAV (partial CAV) method.

FIG. 3(a) shows a conventional data writing by the CLV method. Because the number of rotations of the optical disc at the inner circumference is large, the number of rotations cannot be raised due to the limitation of the rotation controlling system at the inner circumference of the optical disc 1 and a high writing speed becomes impossible. This is not only because of the mechanical limitation due to the requirement of the high torque, but the power consumption of the circuit of the rotational system (the spindle motor 2 and its motor driver 3) is increased beyond the permitted power. In particular, the limitation of the power consumption for a notebook PC is severe, and therefore becomes an important problem for the optical disc apparatus used in the notebook PC.

For the optical disc apparatus of the embodiment, as shown in FIG. 3(c), a plurality of writing zones are allocated on the surface of the optical disc, and therefore, it is possible to perform the ZCLV writing such that the writing speed can be switched for each zone.

Therefore, the number of rotations of the optical disc at the inner circumference can be suppresses. In addition, an average writing speed near the CAV data writing can be achieved by increasing the writing speed at the outer circumference.

For example, as shown in FIG. 3(c), from the innermost circumference toward the outermost circumference of the optical disc 1, three zones Z0, Z1, and Z2 can be divided. The writing speed for each zone Z0, Z1 or Z2 can be set to S1, S2 and S3, respectively.

The problem for the ZCLV method is that it has to maintain the interleave and the continuity of the data train at the zone boundary where the writing speed changes.

in general, because certain time is required to settle down the driving system for rotating the optical disc, as the speed is rapidly changed during the data recording, the quality of the data writing is degraded and the data reproduce becomes impossible. Therefore, once the data writing is stopped at the boundary between zones, it has to restart the data writing after the speed corresponding to the new zone is set.

According to the device described below, the writing interrupt (pause) and the restart capable of maintaining the interleave and the continuity of the data train are performed such that the data train can be recorded without break even though at the boundary between zones.

Figure 15:
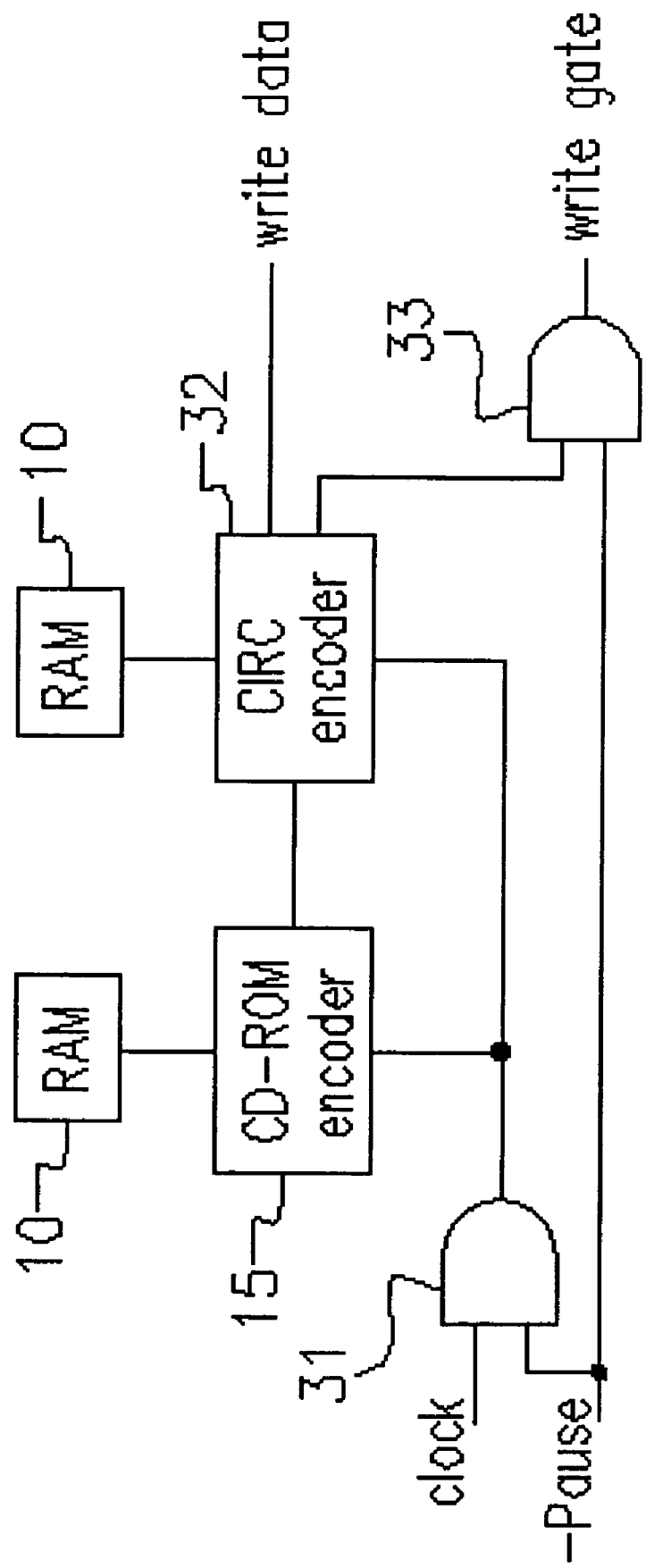
FIG. 15 shows a block diagram of an exemplary circuit for implementing the pause and the restart functions.

FIG. 15 shows a block diagram of an exemplary circuit for implementing the pause and the restart functions above. Namely, because the host computer always transmits data continuously, it is easy to divide the physical writing unit. As shown in FIG. 15 and FIG. 1, as the pause signal -PAUSE is input to an AND circuit 31, the CD-ROM encoder, the clock signal CLOCK input to the CD-ROM encoder 14 and the CIRC (cross interleave Read-Solomon code) encoder 32 is masked, and therefore the encoding operations of the CD-ROM encoder 14 and the CIRC encoder 32 are interrupted and the write data output signal is also terminated. The write gate signal, which is output from the CIRC encoder 32 and is activated to make the data writing possible, is also masked by the AND circuit 33 based on the pause signal -PAUSE. The data writing to the optical disc 1 is also interrupted. Because data during encoding remains in the buffer RAM 10, if the pause signal -PAUSE is deactivated, the write data signal continues to output. Therefore, the mask to the write gate is released and the writing to the optical disc 1 is restarted. However, for the pause and the restart of the writing, the pause signal -PAUSE has to be highly synchronized, and the timing to enter the pause signal (enter the pause operation) is based on the sector unit.

The units for data structure of a CD are simply described, i.e., 1 second=75 sectors (subcode frame), 1 sector=98 EFM frames (frame for short, hereinafter), and 1 frame=588 channel bits (588T), and their respective synchronous signals are the subcode (sector) synchronous clock and the frame synchronous clock. The absolute time information on the optical disc 1 obtained from the ATIP is based on the sector unit. When the general data writing is performed without pause, the ATIP time and the time of the CD encoder 13 are consistent, i.e., the ATIP signal and the subcode synchronous clock for data writing are synchronized to write data. In this situation, deviation of about several frames is permitted. However, for the situation that the pause and the restart above are performed, more accurate writing restart position is required, such as several channel bits.

Figure 16:
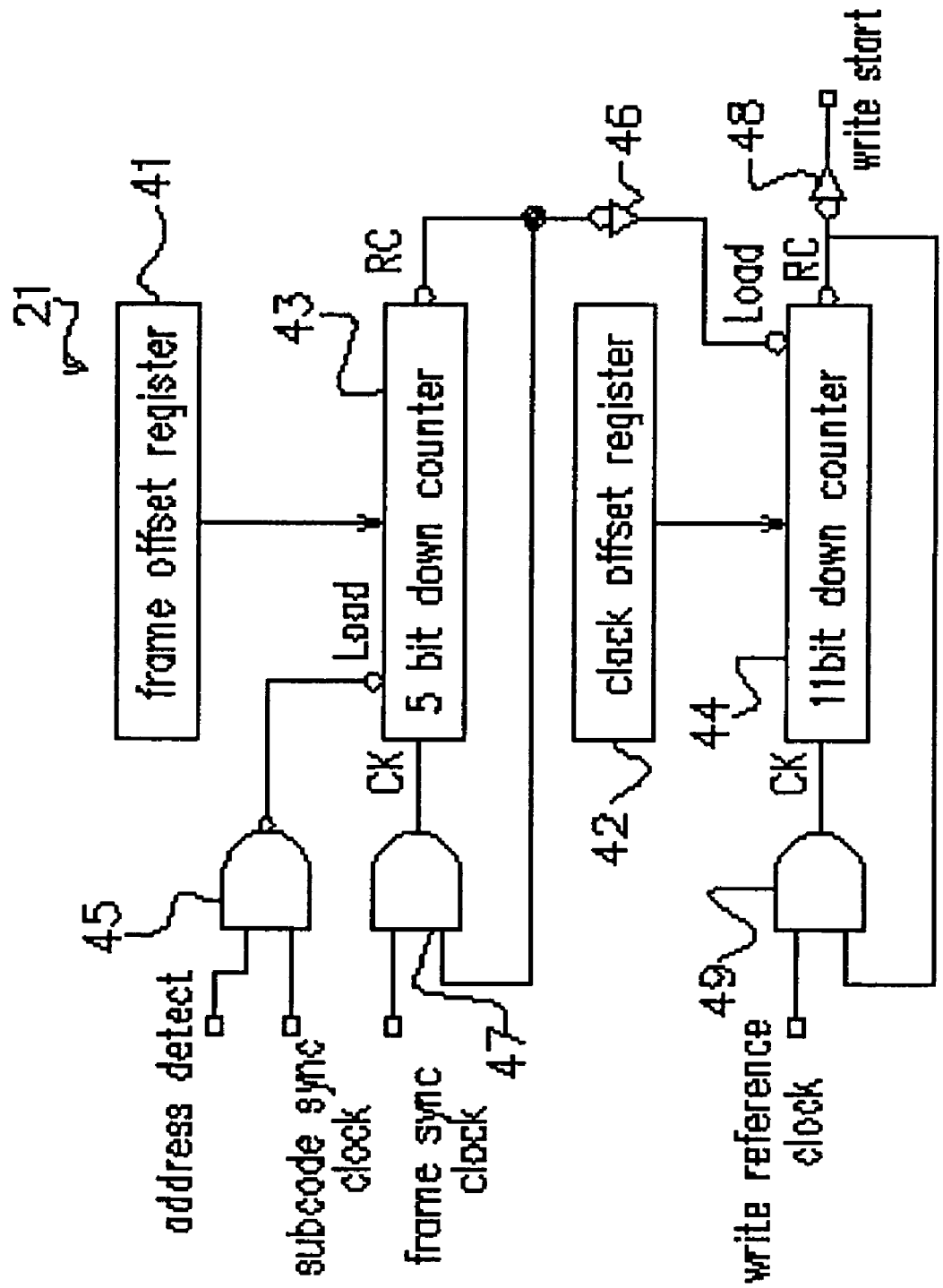
FIG. 16 shows a block diagram of an exemplary circuit of a timing detecting circuit.
Figure 17:
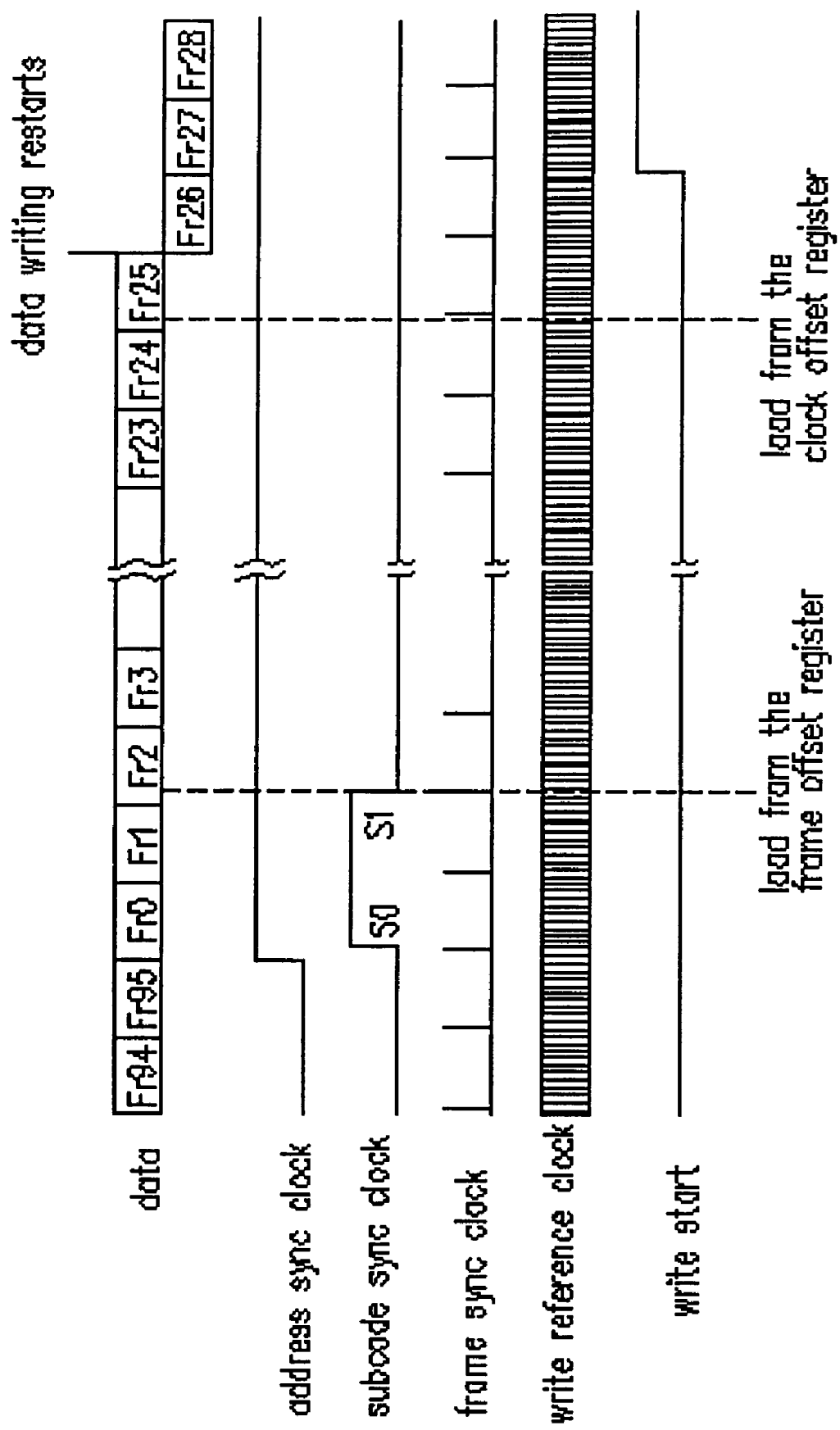
FIG. 17 shows a timing chart of each signal.

In order to determine the writing position properly, the end of the previous writing data has to be matched, which can be executed by a timing detecting circuit 21 shown in FIG. 16. The timing detecting circuit 21 is used for counting the frame synchronous clock and generating a timing signal for providing a start timing of data writing. FIG. 17 shows a timing chart of each signal.

Referring to both FIG. 16 and FIG. 17, in the timing detecting circuit 21, the frame offset register 41 counts the clock number of the frame synchronous clock from the subcode synchronous clock to the frame synchronous clock of the frame Fr25 (the end of the previous data recording). The clock offset register 42 counts the clock number of the write reference clock (channel bit) from the frame synchronous clock of the frame Fr25 to the data writing start position.

In order to restart the data writing, a seeking operation is performed until an address where the data writing to the optical disc 1 is restarted is detected. The seeking operation is performed according to the ATIP information or the address information of the channel sub-code Q. As the address of the writing start sector 1 is detected, a loading signal from an AND circuit 45 is output to the 5-bit down counter 43, the value from the frame offset register 41 is then loaded to the 5-bit down counter 43 using the initial sub-code synchronous clock. The 5-bit down counter 43 decreases the counter using the frame synchronous clock (frame sync clk). As the counting value of the 5-bit down counter 43 becomes 0, a loading signal is output to a 11-bit down counter 44 through an inverter 46, and then the value of the clock offset register 42 is loaded to the 11-bit down counter 44. In addition, the frame synchronous clock input to the 5-bit down counter 43 through the AND circuit 47 is stopped. Afterwards, the 11-bit down counter 44 decreases the counter using the write reference clock. As the counting value of the 11-bit down counter 44 becomes 0, the write start signal is output through an inverter 48. The write reference clock input to the 11-bit down counter 44 through the AND circuit 49 is stopped. Therefore, the pause signal -PAUSE is deactivated by the write reference clock. The values loaded to the offset registers 41, 42 are only examples, which can be determined according to the system and the delay time from the sub-code synchronous clock to the pause signal (-PAUSE) inputted.

The frame synchronous clock, which is obtained by reading the recorded data on the optical disc 1 just before pause, is counted. Then, the encoding clock is delayed by a certain value. Therefore, in the above example, the data writing restarts from the frame Fr26.

Figure 18:
FIG. 18 shows a table for explaining a process executed by the optical disc apparatus.

As described above, for the optical disc apparatus in FIG. 1, a plurality of zones can be set from the innermost circumference to the outermost circumference of the optical disc 1, and the writing speed for each zone can be set. When the data writing is performed by the ZCLV method, a table 51 is prepared as a preset data stored in the ROM 17B (referring to FIG. 1). For example, FIG. 18 shows an example of a first table referred to the table 51. The first table 51 registers five modes of mode 1 to mode 5.

In FIG. 18, the time (or the changing point) t1, t2 on the optical disc 1 showing the boundary where the zones are divided, and the writing speed S1 to S3 for each zone can be set in different mode.

In mode 1, the times t1 and t2 are not set, i.e., no zones are divided. The writing speed is 8×. Namely, the entire optical disc 1 is recorded with an 8× writing speed. In mode 2, the time is only set at 5 minutes. Namely, two zones are divided: the zone Z1 is set from the innermost circumference to a position at 5 minutes, and the zone Z2 is the remained portion of the optical disc 1. The writing speeds S1, S2 for the zones Z1, Z2 are 8× and 12× respectively. At the zone Z1, the CLV writing is performed with the 8× writing speed, and at zone Z2, the CLV writing is performed with the 12× writing speed.

In mode 3, no zones are divided. The entire optical disc 1 is recorded with a 12× writing speed by the CLV writing. In mode 4, three zones Z1 to Z3 are divided. The zone Z1 is set from the innermost circumference to a position at 1 minute, the zone Z1 is set from the position at 1 minute to a position at 10 minutes, and the zone Z3 is set from the position at 10 minutes to the outermost circumference. The zone Z1 is recorded by the CLV writing with a 16× writing speed, the zone Z2 is recorded by the CLV writing with a 20× writing speed, and the zone Z3 is recorded by the CLV writing with a 24× writing speed. In mode 5, two zones Z1 to Z2 are divided. The zone Z1 is set from the innermost circumference to a position at 15 minutes and the zone Z2 is set from the position at 15 minutes to the outermost circumference. The zone Z1 is recorded by the CLV writing with a 20× writing speed and the zone Z2 is recorded by the CLV writing with a 24× writing speed.

The method for determining the ranges of the zones can be according to the time (or the address) on the optical disc 1 as described above. For example, currently, the time on the optical disc 1 can be known as an absolute time showing the ATIP signals on the optical disc. In addition, it can be also determined according to the radius position of the optical disc 1. For example, the position can be set by detecting the rotation of a seeking motor moving the optical pick-up 5 along the radius of the optical disc 1.

In addition, a table 52 shown in FIG. 19 is also stored in the ROM 17B (referring to FIG. 1). The table 52 registers the magnitude of the writing power output from an emitting element (a laser diode, for example) of the optical pick-up 5, for each writing speed used by the optical disc apparatus, when writing data to the optical disc 1. FIG. 19 is an example when a writing power of 25.0 mW is calculated by performing the OPC with an 8× writing speed. The writing powers for the 12× to 24× writing speeds are calculated by multiplying a predetermined constant with the 25 mW writing power for the 8× writing speed. For example, this constant (multiplier) can be obtained by rooting a ratio of 12× to 8×

$$\left(\sqrt{\frac{12}{8}} = 1.22\right).$$

As the 25 mW writing power for the 8× writing speed is multiplied with the multiplier 1.22, the writing power for the 12× writing speed is 30.5 mW. Similarly, the writing powers for the writing speeds 16× to 24× can be obtained, and then the writing power corresponding to each writing speed is registered to the ROM 17B, as the table 52.

Figure 20:
FIG. 20 shows a table for explaining a process executed by the optical disc apparatus.

In addition, a table 53 shown in FIG. 20 is also stored in the ROM 17B (referring to FIG. 1). The table 53 registers types of the optical disc 1 (the maker, media type etc) and their corresponding modes stored in the table 51 in FIG. 18. Determining the type of the optical disc 1 can be performed by reading the ATIP code in a lead-in area of the optical disc 1.

Next, the operation of the embodiment when the optical disc apparatus writes data to the optical disc 1 is described below with reference to FIG. 21.

Figure 21:
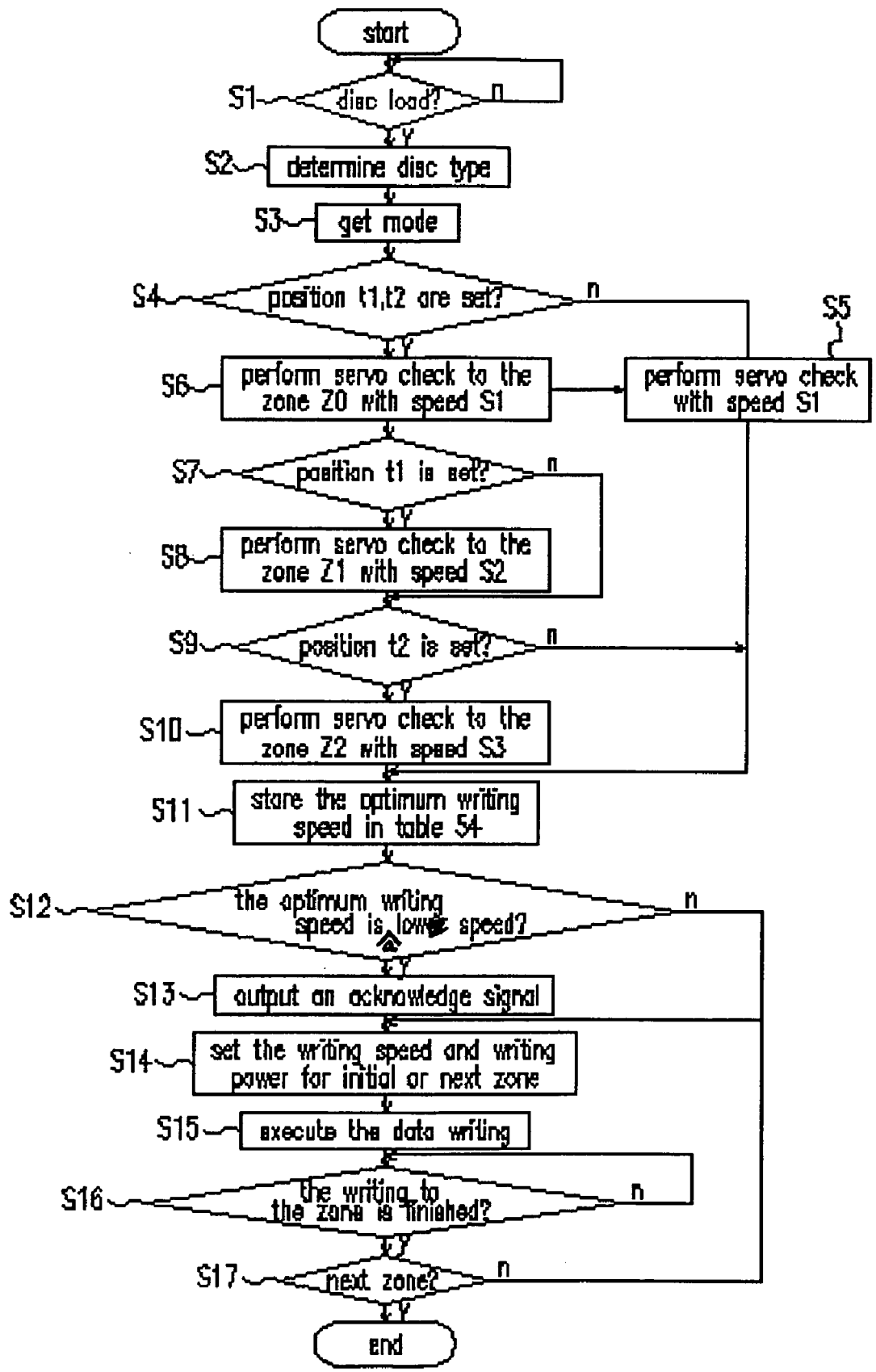
FIG. 21 is flow chart for explaining the writing operation of the optical disc apparatus.

As shown in FIG. 21, the CPU 16 performs a read TOC operation when the optical disc 1 is loaded into the optical disc apparatus (Yes in step S1). Reading the ATIP code in the lead-in area on the optical disc 1, information, showing such as the maker and the media type etc, can be obtained, and therefore the type of the optical disc 1 can be determined by referring information to the table 53 in FIG. 18 (step 52). In addition, the position where data writing is performed on the optical disc 1 can be detected based on the time or the radius of the optical disc 1 according to any conventional method, which is executed by a position detecting device. The step executes a type determining process and can be implemented by a type determining device. Regarding the mode corresponding to the type in the table 53, the writing speeds S1 to S3 and the positions t1, a are read (step 53). A mode setting device or process is executed at step S3.

Based on the writing speeds S1 to S3 and the positions t1, t2 read from the table 51, the deviation of the servo signals from the servo circuit 4 is checked, which will be described in detail in the following paragraphs.

When the positions t1 and t2 are not set in the selected mode (No in step S4), the optical disc apparatus is driven to perform a servo checking with the writing speed S1 (step S5).

In addition, when the positions t1 or t2 are set in the selected mode (Yes in step S4), the optical disc apparatus is driven to perform the servo checking with the writing speed S1 at a region prior to the position t1 or t2, the zone Z0 (step S6). When the position t1 is set (Yes in step S7), the optical disc apparatus is driven to perform the servo checking with the writing speed S2 at a region beyond the position t1, the zone Z1 (step S8). When the position t2 is set (Yes in step S9), the optical disc apparatus is driven to perform the servo checking with the writing speed S3 at a region beyond the position t2, the zone Z2 (step S10). A deviation detecting device or process is executed at steps S6, S8 and S10.

Take the table 51 as an example. In mode 1, because the position t1 or t2 is not set, the servo checking is performed with the writing speed of S1=8× CLV. In mode 4, the servo checking is performed with the writing speed of S1=8× CLV at the region before 1 minute (zone Z0), with the writing speed of S2=20× CLV at the region between 1 minute and 10 minutes (zone Z1), and with the writing speed of S3=24× CLV at the region beyond 10 minutes (zone Z2).

The levels of the servo deviation from the servo checking are collected in three stages at steps S6, S8 and S10, for example. The levels of the servo deviation are stored in a table 54 built in the memory (RAM) 19 (referring to FIG. 1), as shown in FIGS. 22 and 23 for example. In the table 54, the level 0 is good, the level 1 is bad, and the level 2 is very bad. When the level 1 is detected, the writing speed is restricted to lower one level, and when the level 2 is detected, the writing speed is restricted to lower two levels. Therefore, the writing speed S1 to S3 set for each mode can be more restricted according to the levels of the servo disturbance. The detailed process is described below as an example.

The zones and the positions on the optical disc 1 and the servo deviation levels are corrected and stored in the table 54. In this example, the servo checking is performed every 20 minutes for a zone longer than 20 minutes. The original writing speed set according to the mode in the table 51 for each zone is also stored in the table 54 for each zone. For each zone, when the servo deviation level is level 1, the optimum writing speed is stored using the same writing speed as the original writing speed. When the servo deviation level is level 2, the optimum writing speed is stored using a writing speed lower than the original writing speed by one level (16×→12×). When the servo deviation level is level 3, the optimum writing speed is stored using a writing speed lower than the original writing speed by two levels (16×→8×). These optimum writing speeds are then stored in the table 54 (step S11). A first writing speed reducing device or process is executed at step S11.

When the writing speed is lowered by one or two levels and then stored in the table 54 (Yes in step S12), an acknowledging signal is outputted to the host computer (a PC 71 described later) through the host interface 11 to inform that the writing speed is reduced. At the host computer side, the write software executed by the host computer makes the optical disc apparatus perform the writing operation. However, when the above acknowledging signal to inform that the writing speed is reduced is received, a message showing that the writing speed is reduced is displayed on a display of the host computer by the write software, and therefore the user can be noticed.

After noticing the user, the writing is performed to the optical disc 1 by referring to the table 54. The optimum writing speed stored for the initial zone 1 is set as the writing speed of the optical disc apparatus by referring to the table 54, and a writing power corresponding to the above writing speed is set as the writing power of the optical disc apparatus by referring to the table 52 (step S14). The CLV writing is performed to the zone 1 with the writing speed and the writing power set above (step S15). A power controlling device or process is executed at step S14. A CLV controlling device or process is executed at step S15. After step 15, when the writing to the zone 1 is finished (step S16) and a next zone exists (Yes at step 17), the optimum writing speed stored for the next zone is set as the writing speed of the optical disc apparatus by referring to the table 54 again, and a writing power corresponding to the above writing speed is set as the writing power of the optical disc apparatus by referring to the table 52 (step S14). The CLV writing is performed to the next zone with the writing speed and the writing power set above (step S15). The above process is repeatedly performed until the writing to the final zone is finished (No at step S17), and then the whole process is terminated.

According to the process in FIG. 21, because the writing speed for actually writing is set for each zone to verify the servo follow (steps S6, S8, S10), the verification of the servo follow can be exactly performed. Therefore, according to the servo deviation levels showing the degrees of the servo disturbance, the optimum writing speed can be set (step S14) to perform the writing (step S15). The writing speed for each zone is optimized and therefore no servo deviation occurs, by which a high-speed writing is possible.

The servo checking performed at steps S6, S8 and S10 can determine the deviation of the waveform of the tracking error signal (TE) which makes the light spot from the optical pick-up 5 follow the track on the optical disc 1. Namely, the TE signal is generated by the read amplifier 6 according to a signal detected and divided by a well-known device at the optical pick-up 5. Therefore, a tracking error signal generating device or process is executed. In general, in the tracking-on status, as shown in FIG. 24A, the TE signal 56 with respect to the track center 55 maintains at level 0, and the level of the TE signal 57 begins to disturb for the high-speed rotation and the large eccentricity.

For example, the levels of the waveform deviation of the TE signal can be determined by three levels. In FIG. 24B, the TE signal 60 passing through a band pass filter (BPF) is compared with two threshold values 58, 59 to obtain an output signal 61 in FIG. 24C. The level of the duty cycle of the signal 61 can be used as the three-level determination. Therefore, a deviation detecting device or process is executed.

FIG. 25 shows an example for setting the three levels. The divisions of the deviation of the TE signal for the 16× writing zone are a level 0 (good) for a ratio below 10%, a level 1 (bad) for a ratio between 10% and 20%, and a level 2 (very bad) for a ratio above 20%. In addition, the divisions of the deviation of the TE signal for the 20× writing zone are a level 0 (good) for a ratio below 7.5%, a level 1 (bad) for a ratio between 7.5% and 15%, and a level 2 (very bad) for a ratio above 15%. Similarly, the divisions of the deviation of the TE signal for the 24× writing zone are a level 0 (good) for a ratio below 5%, a level 1 (bad) for a ratio between 5% and 10%, and a level 2 (very bad) for a ratio above 10%.

Figure 26:
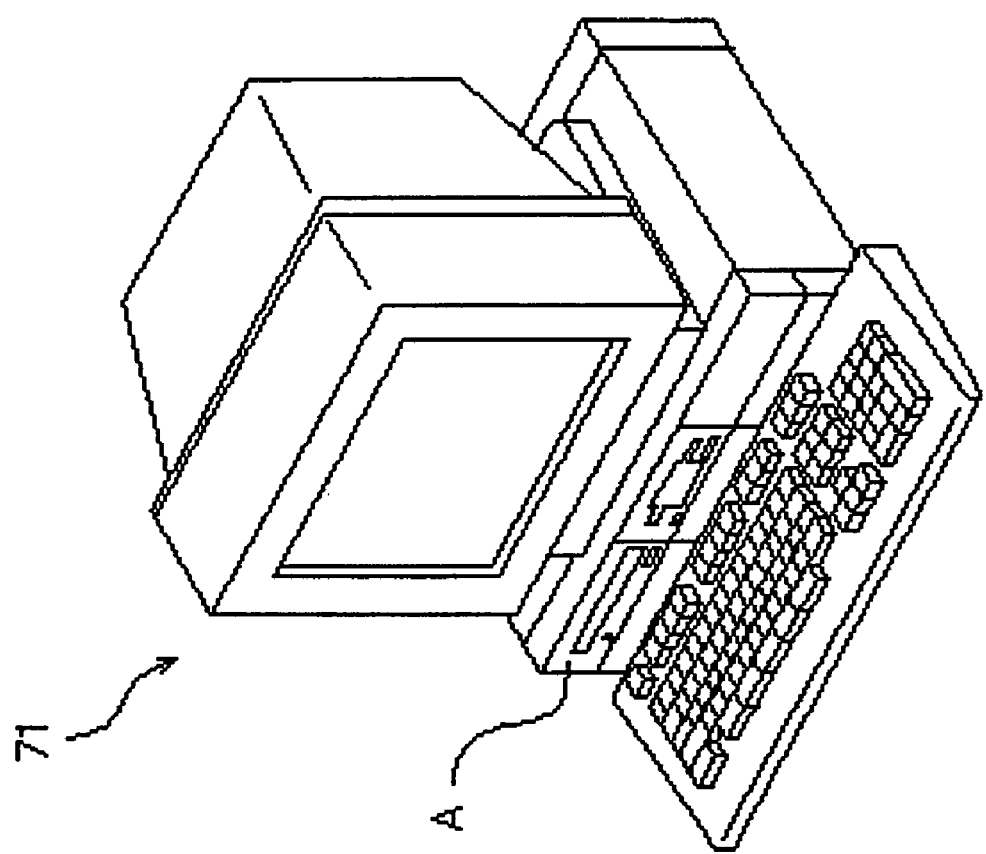
FIG. 26 is a perspective view of a personal computer with the optical disc apparatus of the invention.

FIG. 26 shows a perspective view of a personal computer (PC) 71 in which the optical disc apparatus is installed for executing the information processing apparatus of the invention. The PC 71 can control the optical disc apparatus to perform the data writing to the optical disc 1.

Figure 27:
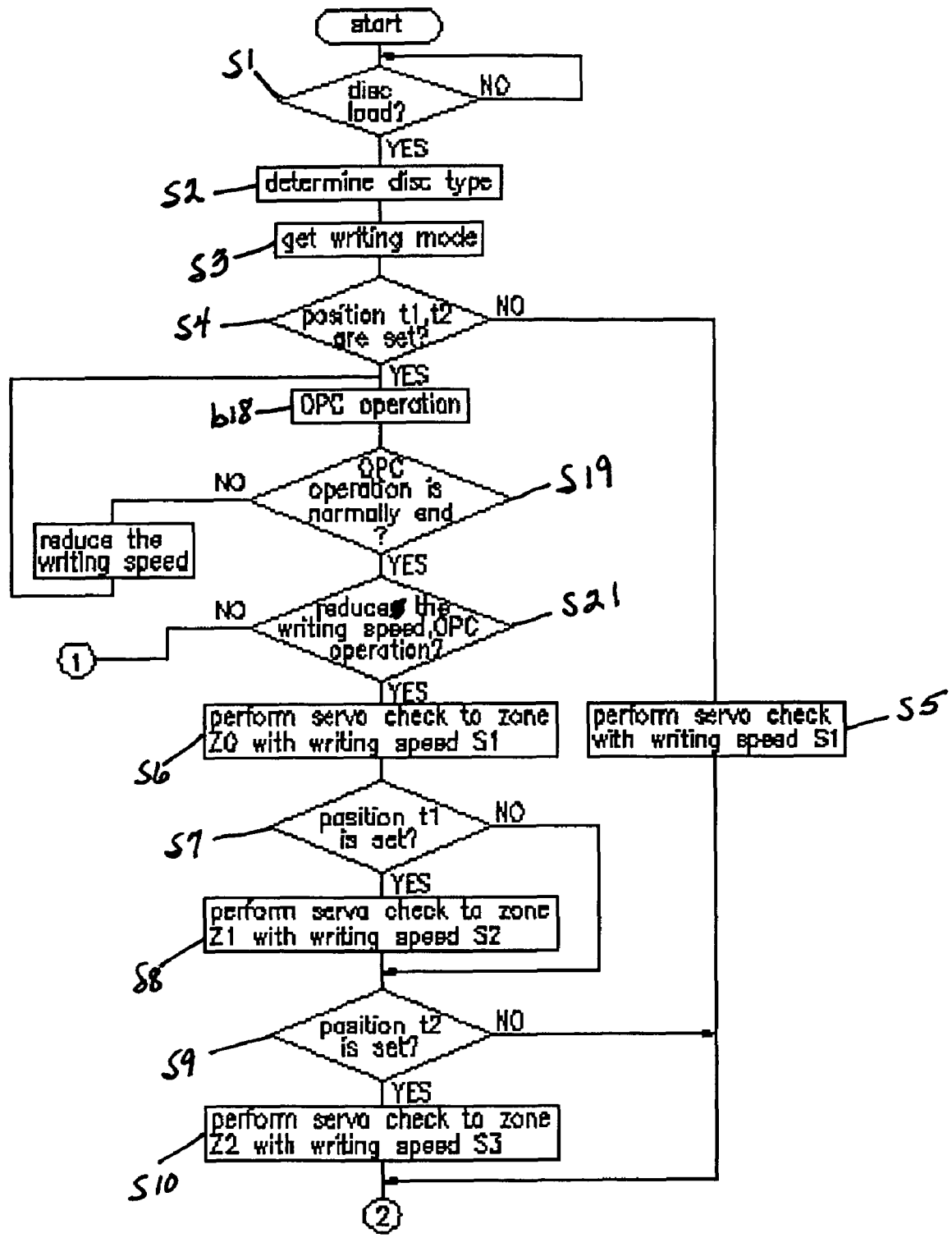
FIG. 27 is a flow chart showing an operation according to another embodiment of the invention.
Figure 28:
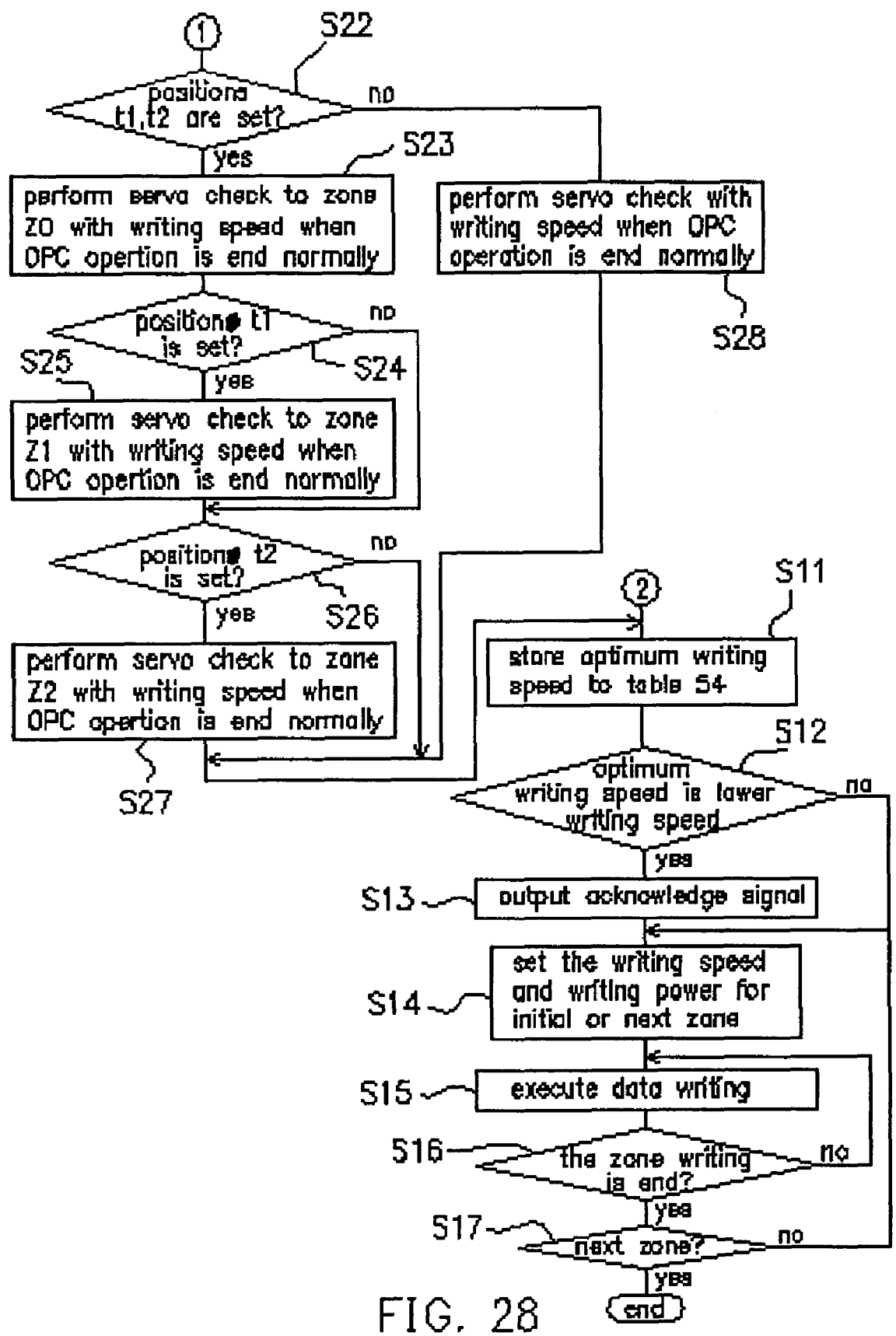
FIG. 28 is a flow chart showing an operation according to another embodiment of the invention.

The following description is another embodiment according to the invention. In this embodiment, the elements are the same as those in the embodiment are labeled the same number, and their corresponding descriptions are omitted. The difference between this and previous embodiments is that the process shown in FIG. 21 is replaced by the processes shown in FIGS. 27 and 28.

Before writing data to the optical disc 1, the optical disc apparatus performs the OPC operation first for calculating an optimum writing power. However, for performing the ZCLV writing, the writing speed is varied up to three levels. The OPC operation is performed with a minimum writing speed of the mode read at step S3 before the servo checking is executed after step S6 (step S18). At step S19, it determines whether the OPC operation stops normally such that no servo error occurs in the servo circuit 4.

When the OPC operation stops normally (Yes at step S19), the servo checking after step S6 is performed. If any abnormal servo error occurs, the writing speed is lowered by one level (for example, 16×→12×), and the OPC operation is performed again (step S18). The OPC operation is performed at step S18 and the OPC determining process is performed at step S19. The OPC determining process is performed again because of "Yes" at step S19. Step 20 performs the writing speed reducing process.

As described above, when the writing speed is lowered (step S20) and the OPC operation is executed (Yes at step S21), the servo checking for each zone is performed with the writing speed when the OPC operation can stop normally. For example, when the OPC operation can stop normally under the 16× writing speed, the servo checking is entirely performed with the 16× writing speed. Namely, when the positions t1 or t2 are set for a certain mode (Yes at step S22), the optical disc apparatus is driven to perform the servo checking at the region prior to the position t1 or t2 (zone Z0) with the writing speed when the OPC operation can stop normally (step S23). Next, when the position t1 is set (Yes at step S24), the optical disc apparatus is driven to perform the servo checking at the region beyond the position t1 (zone Z1) with the writing speed when the OPC operation can stop normally (step S25). When the position t2 is set (Yes at step S26), the optical disc apparatus is driven to perform the servo checking at the region beyond the position t2 (zone Z1 or Z2) with the writing speed when the OPC operation can stop normally (step S27).

When the positions t1 or t2 are not set, the optical disc apparatus is driven to perform the servo checking with the writing speed when the OPC operation can stop normally. Steps S23, S25, S27 and S28 perform the detection of the disturbance.

According to the optical disc apparatus, even if the optical is poor in quality, the spindle motor 2 will not cause the servo deviation and the servo follow can be exactly verified because the writing speed can be set in such a manner that the OPC operation can be finished at the innermost circumference where the optical disc 1 rotates with a highest speed and the servo follow of the surface of the optical disc is verified.

The following description is another embodiment according to the invention. In this embodiment, the elements that are the same as those in previous two embodiments are labeled the same number, and their corresponding descriptions are omitted. The present embodiment differs from the previous two embodiments is that the servo checking at steps S6, S8, S10 is performed according to the waveform deviation of the focusing error signal (FE), rather than the waveform deviation of the TE signal.

Figure 29:
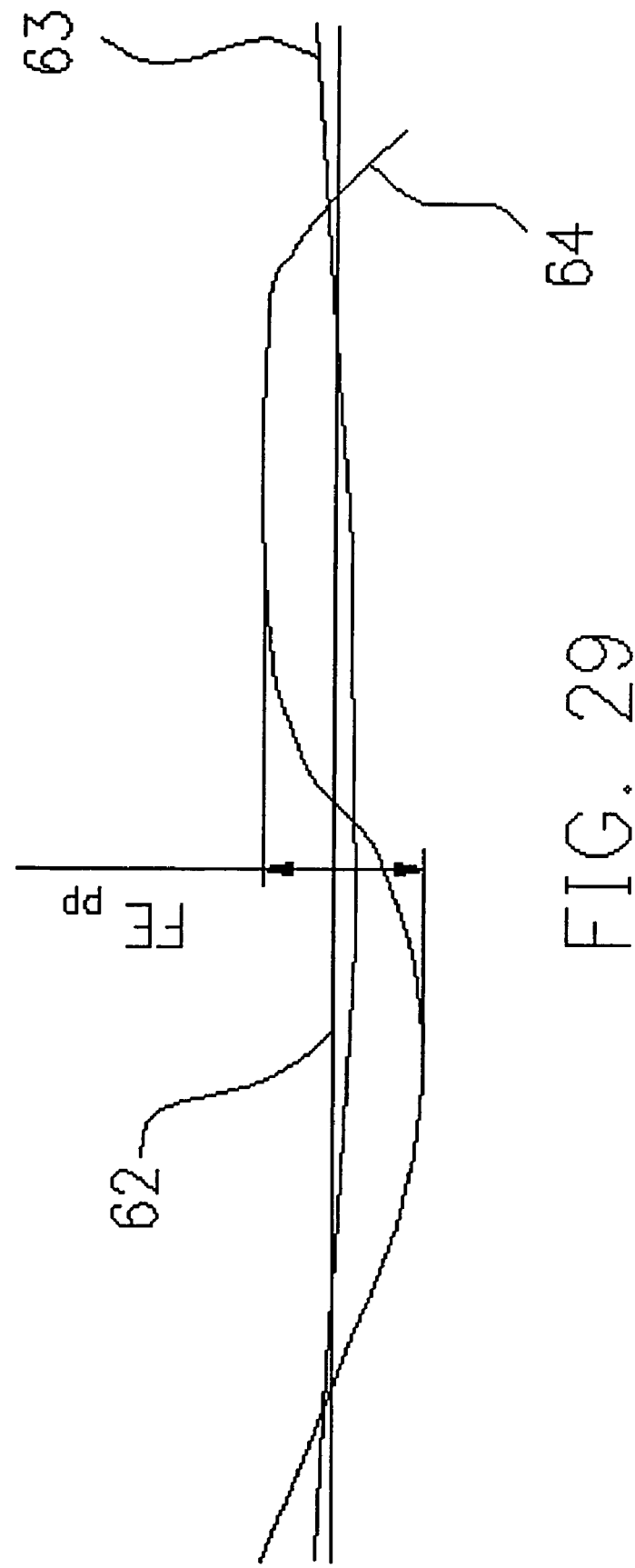
FIG. 29 is a graph for explaining the servo check operation according to another embodiment of the invention.

Namely, the signal detected and divided by the optical pick-up 5 is input to the read amplifier 6 to generate the FE signal. Therefore, a focusing error signal generating device or process is executed. In general, in the focusing-on status, as shown in FIG. 29, the FE signal 63 with respect to the track center 62 maintains at level 0, and the level of the FE signal 64 begins to disturb for the high-speed rotation and the large eccentricity.

For example, the levels of the waveform deviation of the FE signal can be determined by three levels. In FIG. 30, according to the amplitude (peak-to-peak) FEp-p of the FE signal, three levels can be divided. Therefore, a deviation detecting device or process is executed.

Following description is another embodiment according to the invention. In this embodiment, the elements that are the same as those in the previous embodiments are labeled the same number, and their corresponding descriptions are omitted. The present embodiment differs from the previous embodiments is that the servo checking at steps S6, S8, S10 is performed by monitoring both the waveform disturbances of the focusing error signal (FE) and the tracking error signal (TE). According to the deviation level of the servo error signals, the determination can be made by three levels, for example.

For example, as shown in FIG. 31, at the positions of 50 minutes and 70 minutes in the zone Z3, the waveform deviation of the TE signal and the FE signal is determined to level 1, and therefore the optimum writing speed at the zone Z3 is lowered by one level and then the writing is performed with a 20× CLV speed.

Therefore, according to the optical disc apparatus, the servo follow can be verified with high reliability by detecting the deviation of the servo error signals in the focusing direction and in the tracking direction.

As described above, according to the invention, the ZCLV zones can be set to match the mechanical characteristic and the writing characteristic for each disc type, and a high-speed writing can be performed without causing the track deviation. In addition, the ZCLV zones can be set to include the unevenness of the optic disc and the optical disc apparatus.

According to the above embodiments of the invention, both the stable writing and the high-speed writing can be satisfied by obtaining the characteristic of the optical disc. In addition, the position where the writing speed is changed can be changed by obtaining the characteristic of the optical disc from the ATIP information, such that both the stable writing and the high-speed writing can be satisfied.

According to the above embodiments of the invention, the position where the writing speed is changed can be changed by obtaining the characteristic of the optical disc from monitoring the servo status, such that both the stable writing and the high-speed writing can be satisfied. In addition, the position where the writing speed is changed can be changed by obtaining the characteristic of the optical disc from the capacity of the optical disc, such that both the stable writing and the high-speed writing can be satisfied.

According to the invention, the writing can be performed with a high writing speed without failures. In addition, the writing can be performed with a high writing speed without damage to the writing quality.

According to the invention, when the writing is performed to the optical disc, the servo follow can be examined with the writing speed for actually performing the writing to each zone. Because the variation due to the manufacturing dispersion of the optical disc can be absorbed, and the writing speed for each zone is optimized, therefore a high speed writing can be performed without causing the track deviation.

According to the invention, the writing can be performed with an optimum writing speed for each maker or the media type of the optical disc. The CLV writing can be also performed if the zones are not set on the optical disc. By reducing the writing speed by a predetermined level according to the level of the servo signal deviation, a high-speed writing can be performed without causing the servo deviation. The writing can be performed with an optimum writing power corresponding to the writing speed.

According to the invention, even if the optical disc is bad in quality, the Servo follow can be examined without causing the servo deviation because the writing speed at which the optical disc can rotate with a highest speed to finish the OPC operation at the innermost circumference and the servo follow of the disc surface are checked. In addition, the servo follow can be examined by examining the servo signal deviation in the tracking direction. The servo follow can be also examined by examining the servo signal deviation in the focusing direction. Furthermore, a highly reliable servo follow can be examined by examining the servo signal deviation in the focusing direction and in the tracking direction. In addition, when the actual writing speed and the writing speed expected by the user are different, information can be informed to the user.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. An optical disc apparatus for writing a data to an optical disc by a ZCLV (zoned constant linear velocity) method, comprising a changing device for changing a position, where a writing speed for the optical disc is changed from a first constant writing speed for a first zone of the optical disc to a second constant writing speed for a second zone of the optical disc, according to a disc characteristic for writing.

2. The apparatus of claim 1, wherein the changing device determines the position, where a writing speed for the optical disc is changed, according to a servo status with respect to the optical disc.

3. An optical disc apparatus for writing a data to an optical disc by a ZCLV (zoned constant linear velocity) method, comprising a changing device for changing a position, wherein the optical disc apparatus is configured to provide different constant writing speeds for respective zones of the optical disc based on a characteristic of the optical disc.

4. The apparatus of claim 3 configured to provide the different constant writing speeds for the respective zones based on a servo status with respect to the optical disc.

5. An optical disc apparatus for writing a data to an optical disc by a ZCLV (zoned constant linear velocity) method, comprising a changing device for changing a position, wherein the optical disc apparatus is configured to provide a spindle rotation speed response having peaks that correspond to respective zones of the optical disc, and wherein the optical disc apparatus is further configured to change a writing speed for the optical disc according to a disc characteristic for writing.

6. The apparatus of claim 5 configured to change the writing speed for the optical disc according to a servo status with respect to the optical disc.

* * * * *